United States Patent
Wang et al.

(10) Patent No.: US 12,306,303 B2
(45) Date of Patent: May 20, 2025

(54) MIRROR ASSEMBLY FOR LIGHT STEERING

(71) Applicant: Beijing Voyager Technology Co., Ltd., Beijing (CN)

(72) Inventors: Youmin Wang, Mountain View, CA (US); Yufeng Wang, Mountain View, CA (US); Gary Li, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 924 days.

(21) Appl. No.: 17/001,030

(22) Filed: Aug. 24, 2020

(65) Prior Publication Data

US 2022/0057514 A1    Feb. 24, 2022

(51) Int. Cl.
*G01S 17/89* (2020.01)
*G01S 7/481* (2006.01)
*G02B 26/10* (2006.01)

(52) U.S. Cl.
CPC .............. *G01S 17/89* (2013.01); *G01S 7/4811* (2013.01); *G01S 7/4816* (2013.01); *G02B 26/101* (2013.01)

(58) Field of Classification Search
CPC ...... G01S 17/89; G01S 7/4816; G01S 7/4817; G02B 26/101; G02B 26/0858
See application file for complete search history.

(56) References Cited

U.S. PATENT DOCUMENTS

| 6,198,565 | B1 * | 3/2001 | Iseki | G02B 26/0858 359/224.1 |
| 6,681,063 | B1 * | 1/2004 | Kane | G02B 6/3578 359/224.1 |
| 8,174,750 | B2 * | 5/2012 | Akanuma | G02B 26/0858 359/224.1 |
| 8,717,652 | B2 * | 5/2014 | Takahashi | G02B 26/0858 359/198.1 |

(Continued)

FOREIGN PATENT DOCUMENTS

| CN | 110031966 A | * | 7/2019 | ......... G02B 26/0833 |
| CN | 110927960 A | * | 3/2020 | |

(Continued)

OTHER PUBLICATIONS

Machine translation of KR-101897234-B1 (Year: 2018).*

(Continued)

*Primary Examiner* — Yuqing Xiao
*Assistant Examiner* — Jempson Noel
(74) *Attorney, Agent, or Firm* — Kilpatrick Townsend & Stockton LLP

(57) ABSTRACT

In one example, an apparatus being part of a Light Detection and Ranging (LiDAR) module of a vehicle and comprises: a semiconductor integrated circuit comprising a microelectromechanical system (MEMS) and a substrate, the MEMS comprising an array of micro-mirror assemblies, each micro-mirror assembly comprising: a micro-mirror; and an actuator directly connected to the substrate and mechanically connected to an end portion of the micro-mirror and deformable in response to an electrical signal to generate a torque to rotate the micro-mirror around a rotation axis to reflect light emitted by a light source out of the LiDAR module or to reflect light received by the LiDAR module to a receiver.

15 Claims, 20 Drawing Sheets

(56) References Cited

U.S. PATENT DOCUMENTS

| | | | | |
|---|---|---|---|---|
| 8,879,132 | B2* | 11/2014 | Naono | G02B 26/08 |
| | | | | 359/200.7 |
| 9,279,981 | B2* | 3/2016 | Mizutani | G02B 26/105 |
| 9,835,853 | B1* | 12/2017 | Shpunt | G01S 17/89 |
| 9,864,187 | B2* | 1/2018 | Carminati | G02B 26/0833 |
| 10,288,874 | B2* | 5/2019 | Carminati | G01B 11/2518 |
| 11,307,404 | B2* | 4/2022 | Grutzeck | G02B 26/0858 |
| 11,360,300 | B2* | 6/2022 | Ogata | G02B 26/0858 |
| 11,933,966 | B2* | 3/2024 | Carminati | G02B 26/0858 |
| 2001/0022682 | A1* | 9/2001 | McClelland | G02B 26/0841 |
| | | | | 359/290 |
| 2004/0081391 | A1* | 4/2004 | Ko | B81B 3/0062 |
| | | | | 385/18 |
| 2009/0296181 | A1* | 12/2009 | Omori | G02B 26/0841 |
| | | | | 359/224.1 |
| 2010/0290142 | A1* | 11/2010 | Krastev | G02B 26/0833 |
| | | | | 359/872 |
| 2011/0149361 | A1* | 6/2011 | Moidu | G02B 26/0841 |
| | | | | 29/622 |
| 2011/0205608 | A1* | 8/2011 | Mizoguchi | B41J 2/47 |
| | | | | 359/198.1 |
| 2012/0133242 | A1* | 5/2012 | Njikam Njimonzie | |
| | | | | G02B 26/0841 |
| | | | | 310/300 |
| 2014/0062506 | A1* | 3/2014 | Defazio | H04N 9/3129 |
| | | | | 324/658 |
| 2015/0049155 | A1* | 2/2015 | Morikawa | H10N 30/802 |
| | | | | 310/317 |
| 2016/0238834 | A1* | 8/2016 | Erlich | G02B 26/101 |
| 2017/0005257 | A1* | 1/2017 | Uchino | H10N 30/87 |
| 2018/0113200 | A1* | 4/2018 | Steinberg | G02B 26/10 |
| 2018/0329204 | A1* | 11/2018 | Smits | G01S 17/06 |
| 2021/0223536 | A1* | 7/2021 | Brunner | G01S 7/4815 |
| 2021/0231865 | A1* | 7/2021 | Nezhad | G02B 26/0808 |
| 2021/0260859 | A1 | 8/2021 | Le Rhun et al. | |
| 2021/0302717 | A1* | 9/2021 | Man | B81B 3/001 |
| 2021/0325671 | A1 | 10/2021 | Ogino et al. | |

FOREIGN PATENT DOCUMENTS

| | | | | |
|---|---|---|---|---|
| DE | 102018219380 | B4* | 11/2019 | G02B 26/0858 |
| DE | 102019201889 | A1* | 8/2020 | B81B 3/0051 |
| KR | 101897234 | B1* | 9/2018 | G02B 26/0833 |

OTHER PUBLICATIONS

Machine translation of DE-102019201889-A1 (Year: 2020).*
Machine translation of CN-110927960-A (Year: 2020).*
Machine translation of DE-102018219380-B4 (Year: 2019).*
Machine translation of CN-110031966-A (Year: 2019).*
107.JMEMS_12V21_5_2012_A two-dimensional MEMS scanning mirror using hybrid actuation mechanisms with low operation voltage (Year: 2012).*
U.S. Appl. No. 17/001,038 , "Non-Final Office Action", Nov. 30, 2022, 11 pages.
U.S. Appl. No. 17/001,042 , "Non-Final Office Action", Jan. 17, 2023, 11 pages.
U.S. Appl. No. 17/001,042 , "Notice of Allowance", May 9, 2023, 7 pages.

* cited by examiner

MIRROR ASSEMBLY FOR LIGHT STEERING

CROSS-REFERENCES TO RELATED APPLICATIONS

The following U.S. patent applications listed below (which include the present application) are being filed concurrently, and the entire disclosures of the other applications are hereby incorporated by reference into this application for all purposes:
application Ser. No. 17/001,042, filed Aug. 24, 2020, and entitled "Structures for Piezoelectric Actuator to Increase Displacement and Maintain Stiffness";
application Ser. No. 17/001,038, filed Aug. 24, 2020, and entitled "MEMS Scanning Mirror With Piezoelectric Drive Mechanism."

BACKGROUND

Light steering typically involves the projection of light in a predetermined direction to facilitate, for example, the illumination and scanning of a scene, the detection and ranging of one or more objects in the scene, or the like. Light steering can be used in many different fields of applications including, for example, autonomous vehicles or medical diagnostic devices.

Light steering can be performed in both transmission and reception of light. For example, a light steering transmitter may include a micro-mirror array to control the projection direction of light to detect/image an object. Moreover, a light steering receiver may also include a micro-mirror array to select a direction of incident light to be detected by the receiver, to avoid detecting other unwanted signals. The micro-mirror array may include an array of micro-mirror assemblies, with each micro-mirror assembly comprising a micro-mirror and an actuator. A micro-mirror can be rotated around a pivot point by an actuator. Each micro-mirror can be rotated by a rotation angle to reflect (and steer) light towards a target direction.

The performance of a light steering system can be evaluated based on various metrics, such as field of view (FOV) and a detection range. The FOV can define the extent of a scene to be detected/illuminated by the light steering system, whereas the detection range can define the farthest object of the scene that can be detected/illuminated by the light steering system. A range of rotation angle of the micro-mirror can define an FOV. An FOV can define a scanning range of direction of lights to be projected to detect/scan an object. The FOV can also define a range of directions of incident lights, reflected by the object, that are to be detected by the receiver. In addition, a size of the micro-mirror can determine an aperture size of the light steering transmitter/receiver, which can affect the projection range/detection range of the system. It is desirable to increase the FOV and the detection/projection range of the light steering system to increase the extent of a scene that is illuminated and scanned, which can increase the number of objects that can be detected/illuminated in the scene.

BRIEF SUMMARY

Techniques disclosed herein relate generally to microelectromechanical (MEMS) mirrors that can be used in, for example, light detection and ranging (LiDAR) systems or other light beam steering systems. More specifically, and without limitation, disclosed herein are MEMS micro-mirrors that include structures to achieve a large rotation angle, thereby achieving a large scanning angle and thus a large field of view (FOV) for a given resonant frequency and resolution.

In one example, an apparatus is provided. The apparatus being part of a Light Detection and Ranging (LiDAR) module of a vehicle and comprises: a semiconductor integrated circuit comprising a microelectromechanical system (MEMS) and a substrate, the MEMS comprising an array of micro-mirror assemblies, each micro-mirror assembly comprising: a micro-mirror; and an actuator directly connected to the substrate and mechanically connected to an end portion of the micro-mirror and deformable in response to an electrical signal to generate a torque to rotate the micro-mirror around a rotation axis to reflect light emitted by a light source out of the LiDAR module or to reflect light received by the LiDAR module to a receiver.

In some aspects, the actuator comprises a piezoelectric actuator deformable to bend up or down along a first axis perpendicular to the rotation axis of the micro-mirror to exert the torque.

In some aspects, the mechanical connection between the actuator and the micro-mirror comprises one of: the actuator being directly connected to the micro-mirror, or the actuator being directly connected to a gimbal surrounding the micro-mirror, the gimbal being directly connected to the micro-mirror.

In some aspects, the apparatus further comprises a deformable connection structure directly connected to the actuator and mechanically connected to the micro-mirror. The actuator is configured to exert the torque to the micro-mirror via the connection structure. The connection structure deforms when the micro-mirror rotates.

In some aspects, the connection structure is mechanically connected to a side of the micro-mirror that intersects the rotation axis.

In some aspects, the connection structure is mechanically connected to a side of the micro-mirror parallel with the rotation axis.

In some aspects, the connection structure comprises a first bar, a second bar, and a frame structure between the first bar and the second bar, the first bar being directly connected to the actuator, the second bar being mechanically connected to the micro-mirror, and the frame structure being directly connected to each of the first bar and the second bar at, respectively, a first connection point and a second connection point.

In some aspects, the frame structure has a first degree of spring stiffness along a first direction to allow the first connection point to move with respect to the second connection point along the first direction when the micro-mirror rotates. The frame structure has a second degree of spring stiffness along a second direction perpendicular to the first direction. The second degree of spring stiffness is higher than the first degree of spring stiffness to cause the first connection point and the second connection point to move together along the second direction as when the micro-mirror rotates.

In some aspects, the frame structure comprises at least one of: a rectangular shape, an oval shape, or a diamond shape.

In some aspects, the connection structure comprises a serpentine-shaped bar directly connected to the substrate at a first connection point and mechanically connected to the micro-mirror at a second connection point. The serpentine-shaped bar has a first degree of spring stiffness along a first direction to allow the first connection point to move with respect to the second connection point along the first direction when the micro-mirror rotates. The serpentine-shaped bar has a second degree of spring stiffness along a second direction perpendicular to the first direction. The second degree of spring stiffness is higher than the first degree of spring stiffness to cause the first connection point and the second connection point to move together along the second direction as when the micro-mirror rotates.

In some aspects, the actuator, the connection structure, and the micro-mirror are formed from patterning a single layer of silicon material. The micro-mirror assembly is formed by stacking the patterned single layer of silicon material on the substrate having a cavity such that the actuator, the connection structure, and the micro-mirror suspend over the cavity.

In some aspects, the actuator is mechanically connected to a bottom surface of the micro-mirror opposite to a light-reflecting surface of the micro-mirror.

In some aspects, the micro-mirror is formed from patterning a first layer of silicon material. The actuator is formed from patterning a second layer of silicon material. The micro-mirror assembly is formed by stacking the patterned first layer of silicon material and the patterned second layer of silicon material on the substrate having a cavity such that the actuator and the micro-mirror suspend over the cavity.

In some aspects, the actuator is a first actuator, the end is a first end. The apparatus further comprises a second actuator mechanically connected to a second end of the micro-mirror, the second end being opposite to the first end. The first actuator and the second actuator are configured to bend at opposite directions and to move, respectively, the first end and the second end by the same displacement.

In some aspects, the micro-mirror is not mechanically connected to the substrate at the rotational axis.

In some aspects, the apparatus further comprises a pair of connection structures mechanically connected to the micro-mirror and placed over a pair of grooves formed on the substrate, the pair of connection structures being rotatable over the pair of grooves.

In some aspects, a frequency of rotation of the micro-mirror is set based on a degree of spring stiffness of the deformable actuator.

In some aspects, the apparatus further comprises a controller configured to control the actuator of each micro-mirror assembly of the array of micro-mirror assemblies to rotate the micro-mirror of the respective micro-mirror assembly to set one of: an input path of light to the receiver, or an output projection path of light from the light source.

In some aspects, wherein the light source is a pulsed light source; wherein the controller is configured to: control the light source to generate a first light pulse at a first time; control the actuator to set a first angle of the output projection path to project the first light pulse towards an object along the output projection path; control the actuator of each micro-mirror assembly to set a second angle of the input path to steer a second light pulse reflected from the object to the receiver, the second light pulse being received at the receiver at a second time; and determine a location of the object with respect to the apparatus based on a difference between the first time and the second time, as well as on the first angle and the second angle.

In some aspects, a method comprises: determining a target rotation angle of a micro-mirror of each micro-mirror assembly of an array of micro-mirror assemblies of a microelectromechanical system (MEMS) implemented on a semiconductor substrate, each micro-assembly further comprising a deformable actuator directly connected to the substrate and mechanically connected to an end portion of the micro-mirror, the MEMS being part of a Light Detection and Ranging (LiDAR) module; generating, based on the target rotation angle, an electrical signal; deforming, using the electrical signal, the actuator of each mirror-mirror assembly to generate a torque; and rotating, using the torque, the micro-mirror of each micro-mirror assembly around a rotation axis by the target rotation angle to reflect light emitted by a light source out of the LiDAR module or to reflect light received by the LiDAR module to a receiver.

BRIEF DESCRIPTION OF THE DRAWINGS

The detailed description is set forth with reference to the accompanying figures.

DETAILED DESCRIPTION

Figure 1:
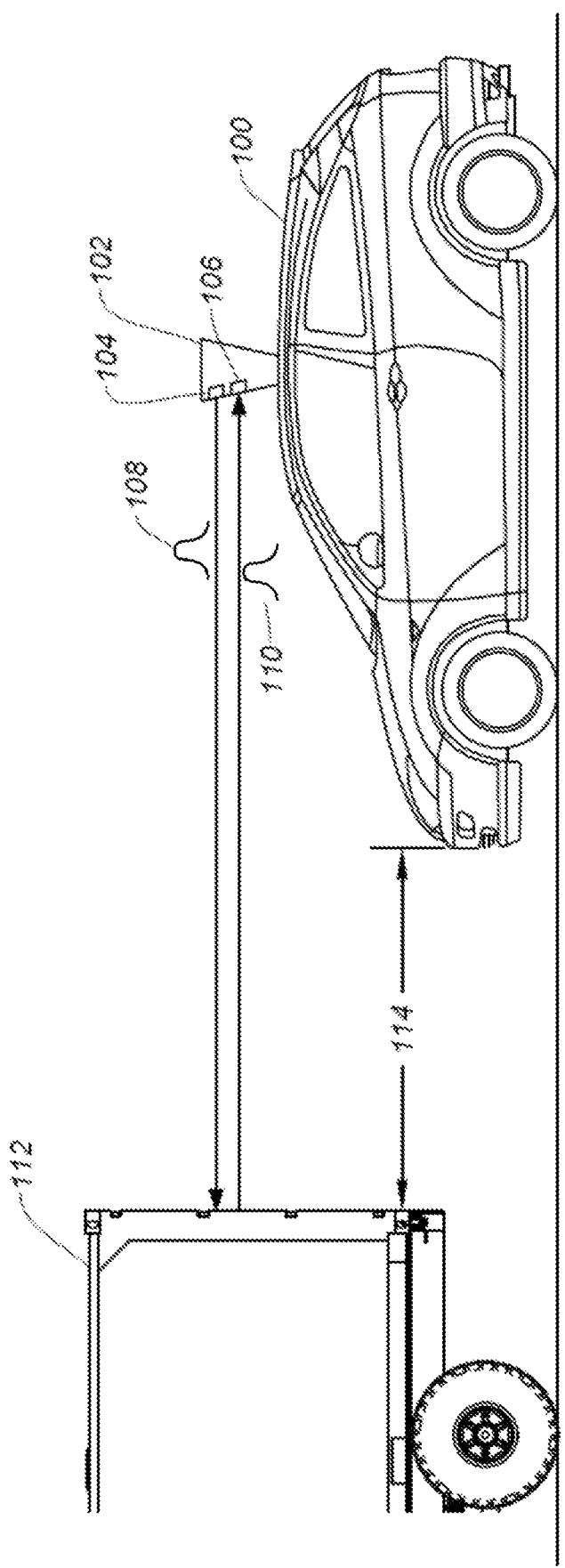
FIG. 1 shows an autonomous driving vehicle utilizing aspects of certain examples of the disclosed techniques herein.

In the following description, various examples of a mirror assembly and a light steering system will be described. For purposes of explanation, specific configurations and details are set forth to provide a thorough understanding of the examples. However, it will be apparent to one skilled in the art that certain examples may be practiced or implemented without every detail disclosed. Furthermore, well-known features may be omitted or simplified to prevent any obfuscation of the novel features described herein.

Light steering can be found in different applications. For example, a Light Detection and Ranging (LiDAR) module of a vehicle may include a light steering system. The light steering system can be part of the transmitter to steer light towards different directions to detect obstacles around the vehicle and to determine the distances between the obstacles and the vehicle, which can be used for autonomous driving. Moreover, a light steering receiver may also include a micro-mirror array to select a direction of incident light to be detected by the receiver, to avoid detecting other unwanted signals. Further, the headlight of a manually driven vehicle can include the light steering transmitter, which can be controlled to focus light towards a particular direction to improve visibility for the driver. In another example, optical diagnostic equipment, such as an endoscope, can include a light steering transmitter to steer light in different directions onto an object in a sequential scanning process to obtain an image of the object for diagnosis.

Light steering can be implemented by way of a micro-mirror array. The micro-mirror array can have an array of micro-mirror assemblies, with each micro-mirror assembly having a movable micro-mirror and an associated actuator (or multiple actuators). In each micro-mirror assembly, the actuator can be controlled to exert a torque to rotate the micro-mirror around a pivot by a rotation angle to reflect (and steer) light towards a target direction. The micro-mirrors and actuators can be formed as microelectromechanical systems (MEMS) on a semiconductor substrate. Such arrangements allow integration of the MEMS with other circuitries (e.g., controller, interface circuits) on the semiconductor substrate.

The array of micro-mirrors can receive an incident light beam, and each micro-mirror can be rotated at a common rotation angle to project/steer the incident light beam at a target direction. Each micro-mirror can be rotated around two orthogonal axes, and the rotation movements of the micro-mirror can define the overall performance of the light steering system. Specifically, a first range of rotation angles of the micro-mirror about a first axis can define a first range of projection angles along a vertical dimension, whereas a second range of rotation angles of the micro-mirror about a second axis can define a second range of projection angles along a horizontal dimension. The first range and the second range of projection angles can define a two-dimensional field of view (FOV) in which light is to be projected to detect/scan an object. The FOV can also define a two-dimensional range of directions of incident lights, reflected by the object, that are to be detected by the receiver. In addition, the size of the micro-mirror can determine the available reflective area of the micro-mirror, which in turn can define the aperture size of the micro-mirror and the detection/projection range of the light steering system. Furthermore, the frequency at which the micro-mirror rotates can define the time it takes for each micro-mirror to sweep through the ranges of projection, which can affect the resolution of the scanning operation. A higher resolution of the scanning operation can be achieved by increasing the rotation frequency of the micro-mirrors.

The range of rotation angles of the micro-mirror of a micro-mirror assembly, as well as the rotation frequency of the micro-mirror, can be affected by various attributes of the micro-mirror assembly, such as the structure of the actuator or the structure and/or the material of the micro-mirror. For example, the actuator may include a comb drive having two sets of fingers. One set of fingers, which is static, may be formed on the semiconductor substrate, whereas the other set of fingers may be formed on an edge of the micro-mirror and is movable. A voltage difference between the two sets of fingers can create an electrostatic force, which can cause the micro-mirror to rotate when the two sets of fingers engage each other, and the rotation angle can correspond to the voltage difference. But when the rotation angle of the micro-mirror reaches a disengagement angle where the two sets of fingers no longer engage each other and no longer experience the electrostatic force, the micro-mirror cannot rotate further, and the disengagement angle can set an upper limit of the rotation angle. The disengagement angle may be reduced when the size of the micro-mirror increases to increase the aperture size and the detection range, since the movable set of fingers on the edge of the micro-mirror becomes further away from pivot and can experience a larger displacement. As a result, the aperture size (and the size of the micro-mirror) can limit the range of the rotation angle as well as the FOV.

As another example, the rotation angle as well as the rotation frequency of the micro-mirror can be affected by other components of the micro-mirror assembly, such as a pivot connection structure (e.g., a torsion bar, a spring) between the micro-mirror and the semiconductor substrate to set a pivot point of rotation. The pivot connection structure may need to be deformed to accommodate the rotation of the micro-mirror. The pivot connection structure has a considerable degree of spring stiffness, which needs to be overcome by the actuator to deform the pivot connection structure. The degree of spring stiffness can define the rotation angle of the micro-mirror for a given torque provided by the actuator, with a smaller spring stiffness leading to a larger rotation angle and vice versa. In addition, the frequency of rotation can also be affected by the degree of spring stiffness of the pivot connection structure. With a higher spring stiffness, the pivot connection structure can return the micro-mirror back to its default orientation faster, which can increase the frequency of rotation of the micro-mirror as well as the scanning resolution. But a higher spring stiffness can decrease the rotation angle of the micro-mirror for a given torque.

It is desirable to increase the detection range, the FOV, and the scanning resolution of the light steering system. In a case where the light steering system is part of a LiDAR system of a vehicle, increasing the detection range allows the LiDAR system to detect objects (e.g., a pedestrian, another vehicle, other obstacles) farther away from the vehicle. Moreover, increasing the FOV allows the LiDAR system to detect a larger extent of a scene, which can capture more information about the environment the vehicle is in. Further, increasing the scanning resolution allows the LiDAR system to capture the information at a higher rate and to track fast-moving objects. All these can improve the performance of the LiDAR system in detecting objects around the vehicle, some of which can pose danger to the vehicle. The safety of the vehicle can be improved as a result. However, as explained above, the detection range, the FOV, and the scanning frequency can impose conflicting requirements on the micro-mirror. For example, a larger micro-mirror can increase the detection range but also reduce the maximum rotation angle and the range of rotation angles of the micro-mirror, which reduces the FOV. Moreover, a higher scanning frequency may require the pivot connection structure to have a higher degree of spring stiffness, but then the higher degree of spring stiffness of the pivot connection structure can also reduce the maximum rotation angle of the micro-mirror and the FOV.

Conceptual Overview of Certain Examples

Examples of the present disclosure relate to a light steering system that can address the problems described above. Various examples of the light steering can include a plurality of micro-mirrors to perform light steering, such as those shown and described below with respect to FIG. 2A-FIG. 6B. The light steering system can be used as part of a transmitter to control a direction of projection of output light. The light steering system can also be used as part of a receiver to select a direction of input light to be detected by the receiver. The light steering system can also be used in a coaxial configuration such that the light steering system can project output light to a location and detect light reflected from that location.

In some examples, a light steering system may include a light source, a semiconductor integrated circuit comprising an MEMS, a substrate in which a controller is formed, as well as a receiver. The MEMS may include an array of micro-mirror assemblies, each micro-mirror assembly comprising a micro-mirror. The micro-mirror assemblies of the MEMS may be configured to reflect light from the light source along an output projection path. The micro-mirror assemblies of the MEMS may also be configured to reflect incident light propagating along an input path to the receiver. In each micro-mirror assembly, the micro-mirror is rotatable around to a rotation axis according to a target rotation angle to reflect (and steer) light towards a target direction in the FOV. Each micro-mirror assembly further includes an actuator controllable by the controller to rotate the micro-mirror by the target rotation angle.

In some examples, in each micro-mirror assembly, the actuator is directly connected to the substrate and is mechanically connected to an end portion of the micro-mirror. The actuator is deformable in response to an electrical signal from the controller to exert a force at the end of the micro-mirror. The force can create a torque to rotate the micro-mirror around a rotation axis. As used herein, "mechanically connected" or "connected" can include a direct physical connection or an indirect physical connection. In one example, the actuator can be directly connected to the micro-mirror. In another example, the actuator can be indirectly connected to the micro-mirror via, for example, a force-transfer connection structure and/or a frame (e.g., a gimbal) that surrounds the micro-mirror.

In some examples, the actuator includes a piezoelectric actuator deformable to bend up or down along a first axis perpendicular to the rotation axis of the micro-mirror to exert the force. As the piezoelectric actuator bends, the piezoelectric actuator can move the end of the micro-mirror to tilt the micro-mirror, which causes the micro-mirror to rotate around the rotation axis. The piezoelectric actuator may include a layer of lead zirconate titanate (PZT) material formed on a layer of elastic material, such as silicon.

Unlike the case of comb drive where there is no physical connection between the two sets of fingers and where the comb drive may be unable to exert a force on the micro-mirror when the two sets of fingers disengage, with the disclosed techniques the piezoelectric actuator can remain mechanically connected with the micro-mirror as the micro-mirror rotates. Such arrangements allow the piezoelectric actuator to continue to exert the torque and set the rotation angle of the micro-mirror even when the opposite ends of the micro-mirror experience a large displacement from their initial positions. As a result, the achievable range of rotation angle of the micro-mirror, as well as the FOV, can be increased, while the range of rotation angle is not (or less) limited by the dimension of the micro-mirror, which allows improvements in both the FOV and detection range of the light steering system.

Figure 4A:
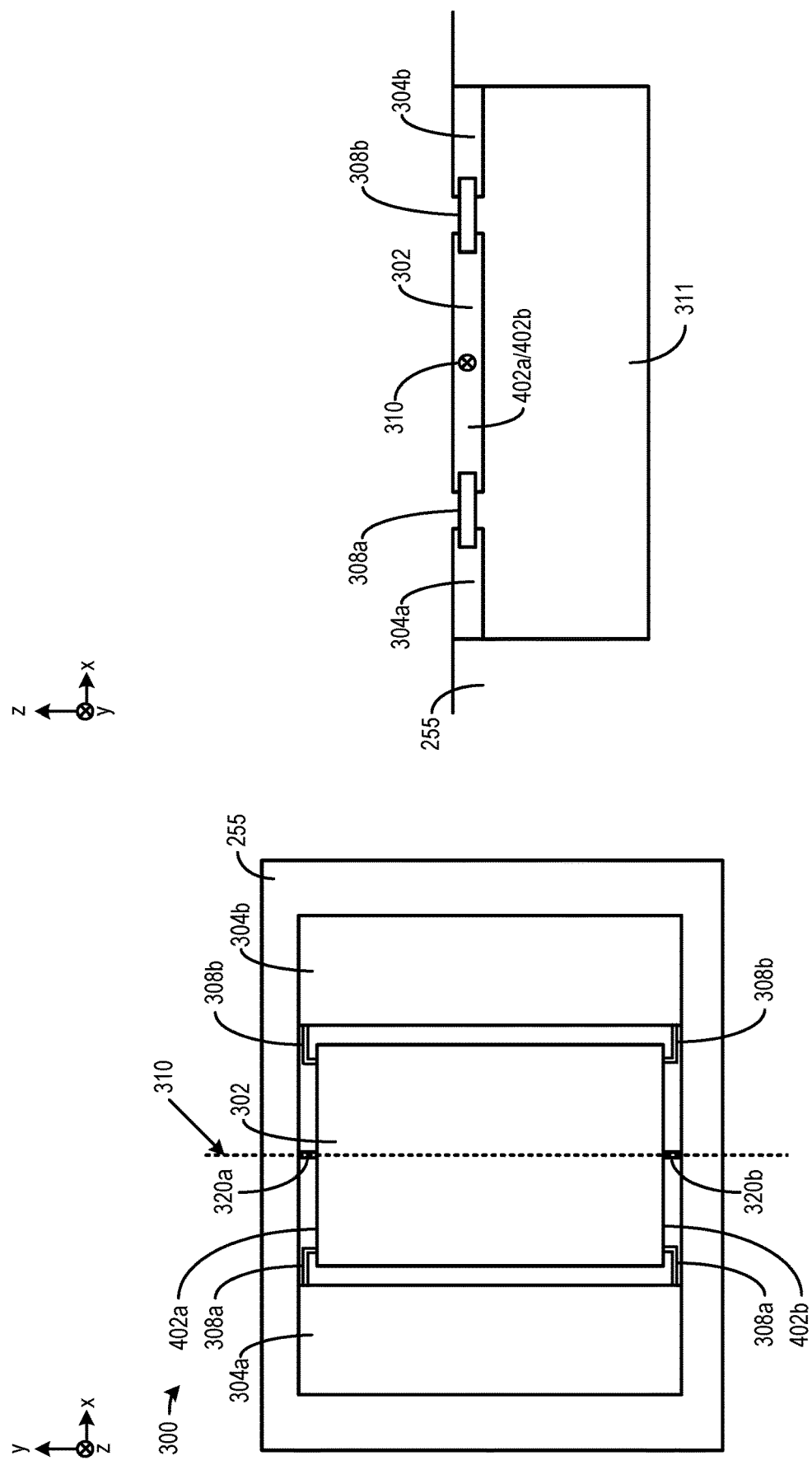
FIG. 4A, FIG. 4B, FIG. 4C, and FIG. 4D illustrate additional examples of micro-mirror assembly of FIG. 3A-FIG. 3C and their operations, according to examples of the present disclosure.
Figure 4B:
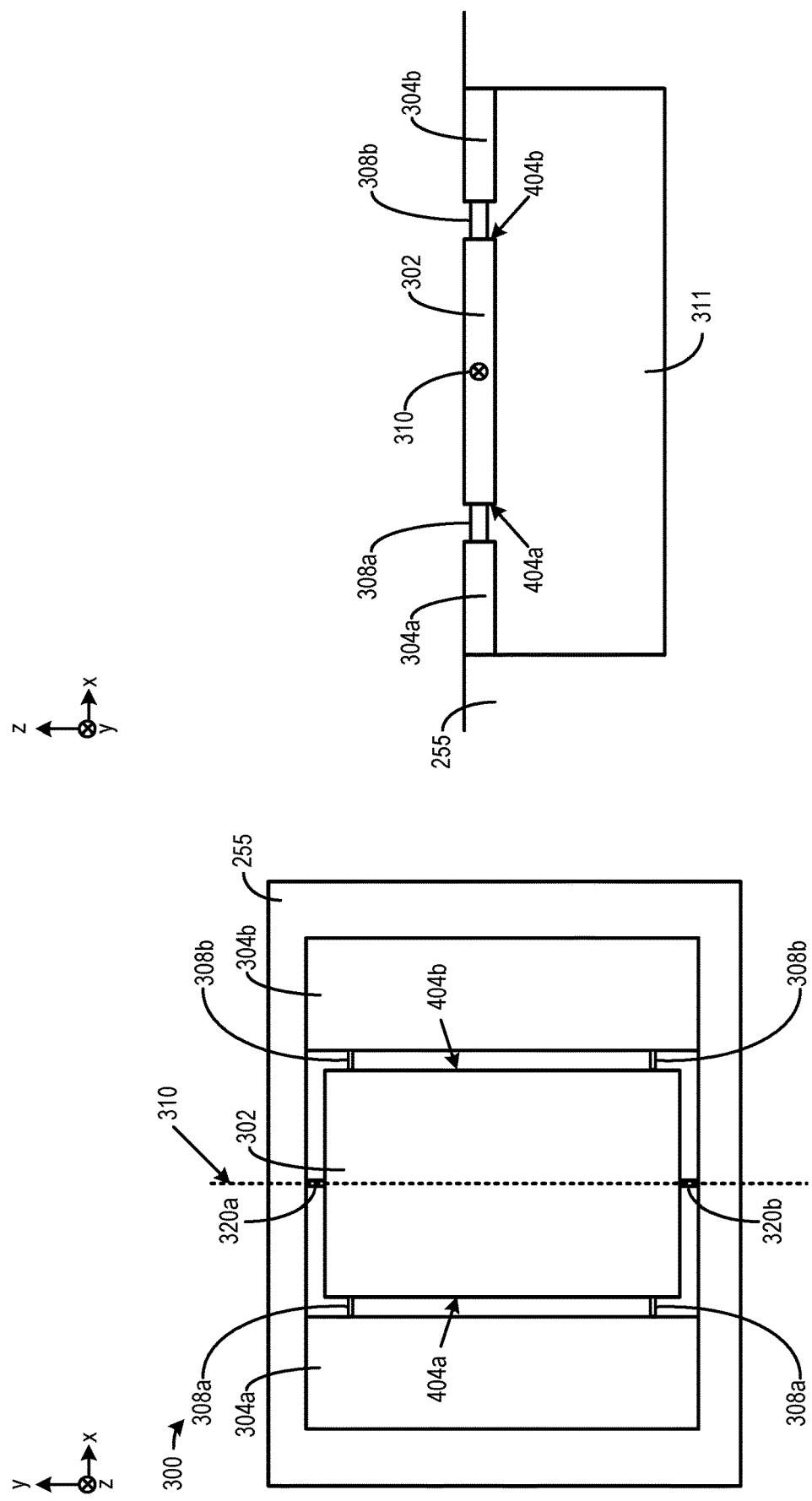

Various examples of driving arrangements of piezoelectric actuators are disclosed. In one example, as shown in FIG. 4A-FIG. 4E, the piezoelectric actuator can be mechanically connected to the end portion of the micro-mirror via one or more deformable force-transfer connection structures. One end of the deformable force-transfer connection is directly connected to the piezoelectric actuator. In one example, another end of the deformable force-transfer connection structure is directly connected to a first side surface of the micro-mirror (or of the gimbal) that intersects with the rotation axis, as shown in FIG. 4A. In another example, another end of the deformable force-transfer connection structure is directly connected to a second side surface of the micro-mirror (or of the gimbal) that runs parallel with the rotation axis, as shown in FIG. 4B. In both examples, the force-transfer connection structures are connected to a part of the first surface or the second surface at the end portion of the micro-mirror away from the rotation axis, such that a force exerted by the force-transfer connection structure (transferred from the actuator) can create a torque around the rotation axis of the micro-mirror. The actuator, the force-transfer connection structures, and the micro-mirror can be formed from patterning a single layer of silicon material, following by coating a layer of PZT material over the region(s) of the silicon material that correspond to the actuator. A micro-mirror assembly can be formed by stacking the patterned single layer of silicon material on the substrate having a cavity such that the actuator, the connection structure, and the micro-mirror suspend over the cavity, which provides space for the actuator to bend and for the micro-mirror to rotate.

Figure 4C:
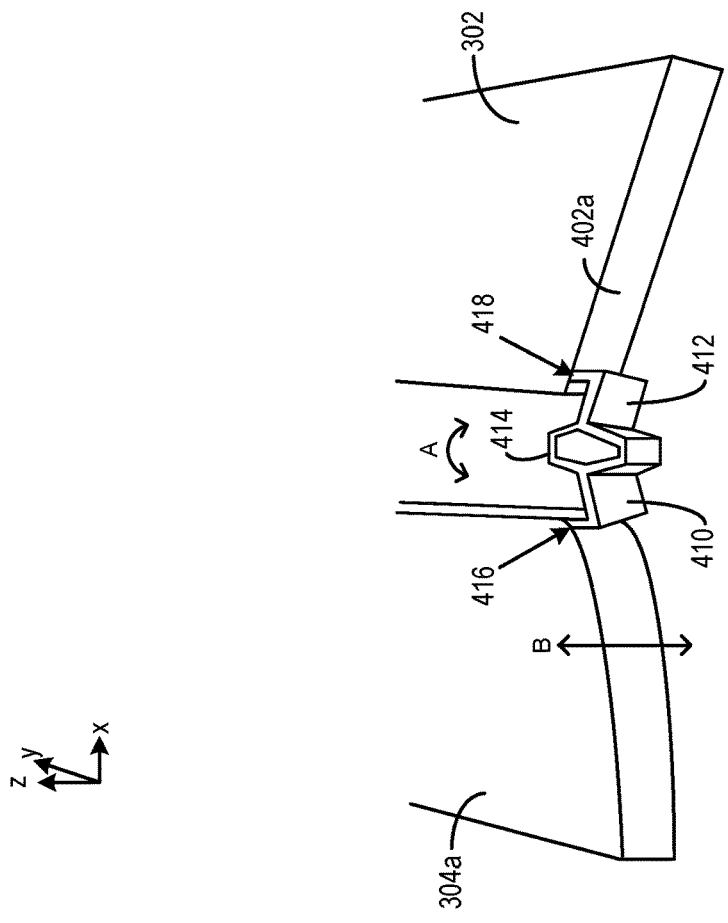
Figure 4C:
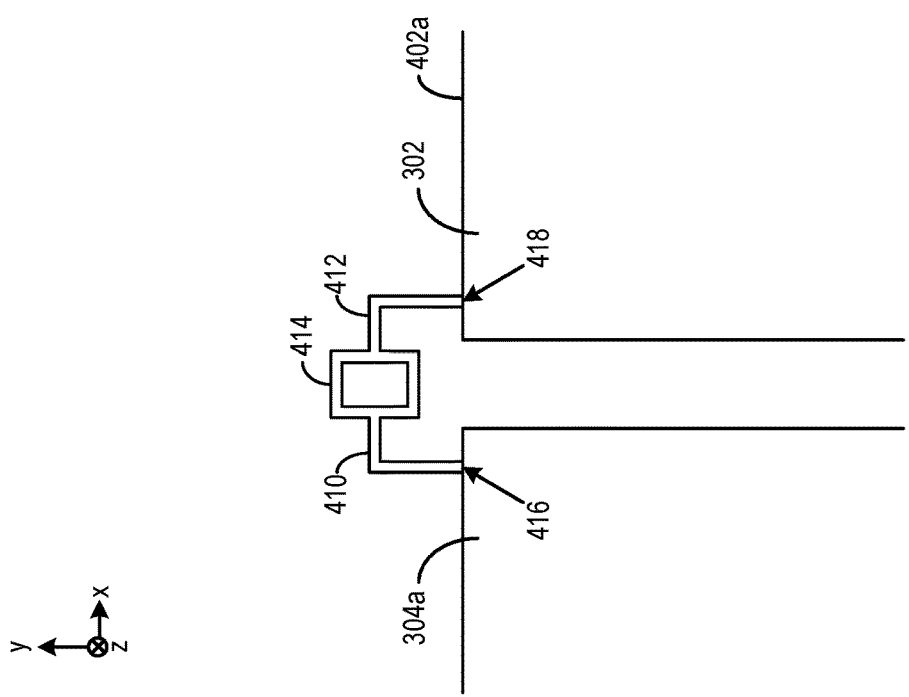

Various examples of force-transfer connection structure are proposed. In one example, as shown in FIG. 4C, the connection structure can include a first bar, a second bar, and a frame structure connected between the first bar and the second bar. The first bar is directly connected to the actuator at a first connection point, whereas the second bar is directly connected to the gimbal/micro-mirror at a second connection point. Opposite ends of the first bar and the second bar are directly connected to two sides of the frame structure. As the actuator bends, the first and second connection points may move towards and away from each other depending on the direction of the bending. The frame structure is deformable to accommodate the relative movements of the two connection points, yet the frame structure also has the requisite degree of spring stiffness to transfer a bending force of the actuator to the micro-mirror to provide the torque. In some examples, the frame structure can have different degrees of spring stiffness along different directions. For example, the frame structure may a relatively low degree of spring stiffness along a horizontal direction (e.g., parallel with the substrate) to allow the first and second connection points to move towards or away from each other along the horizontal direction. Moreover, the frame structure may have a relatively high degree of spring stiffness (higher than that along the horizontal direction) along a vertical direction to force the first and second connection points to move up or down together, so as to transfer the bending force to provide the torque to the micro-mirror.

Figure 4D:
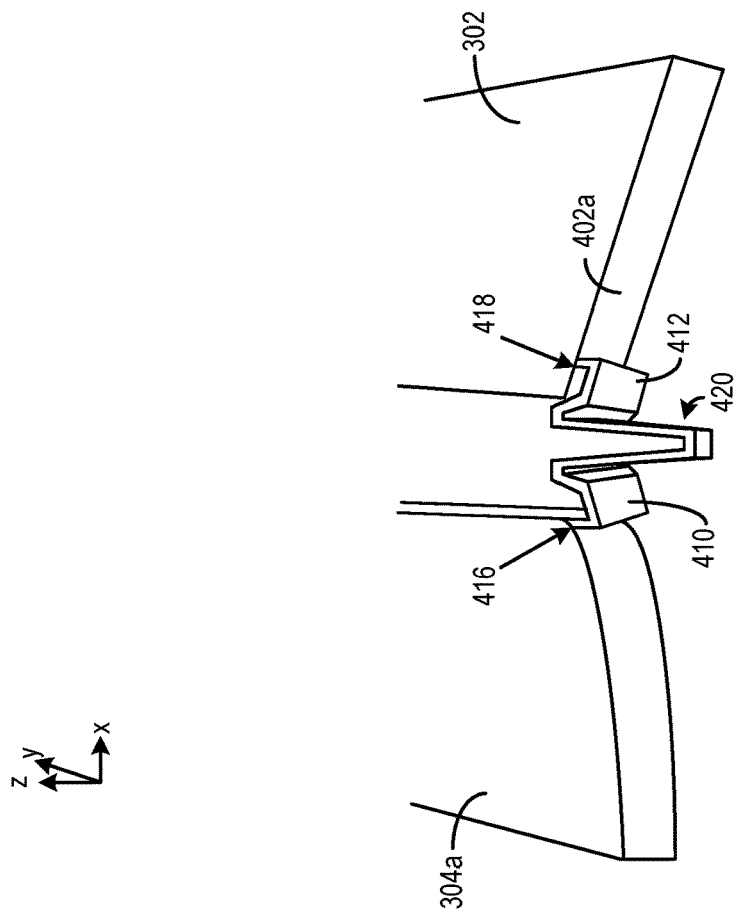
Figure 4D:
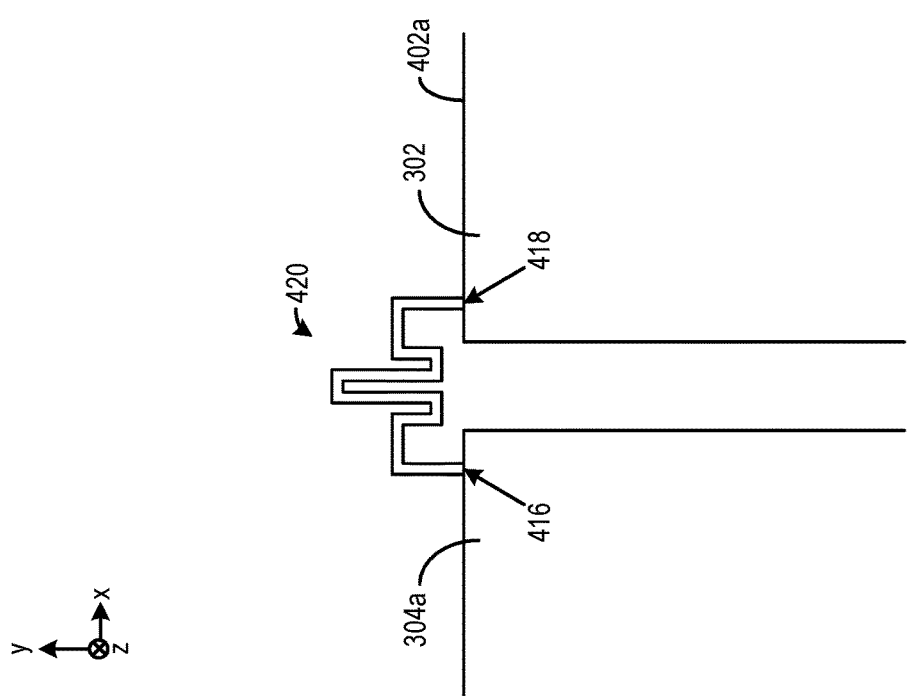

As another example, as shown in FIG. 4D, the force-transfer connection structure can include a deformable bar having a serpentine or spring shape. One end of the deformable bar is directly connected to the actuator at a first connection point, whereas another end of the deformable bar is directly connected to the gimbal/micro-mirror at a second connection point. Just like the frame structure of FIG. 4C, the bar in FIG. 4D has a relatively low degree of spring stiffness along the horizontal direction to accommodate the relative movements of the two connection points along the horizontal direction, yet the bar also has a relatively high degree of spring stiffness along the vertical direction to force the two connection points to move up or down together, so as to transfer a bending force of the actuator to the micro-mirror to provide the torque.

Figure 5:
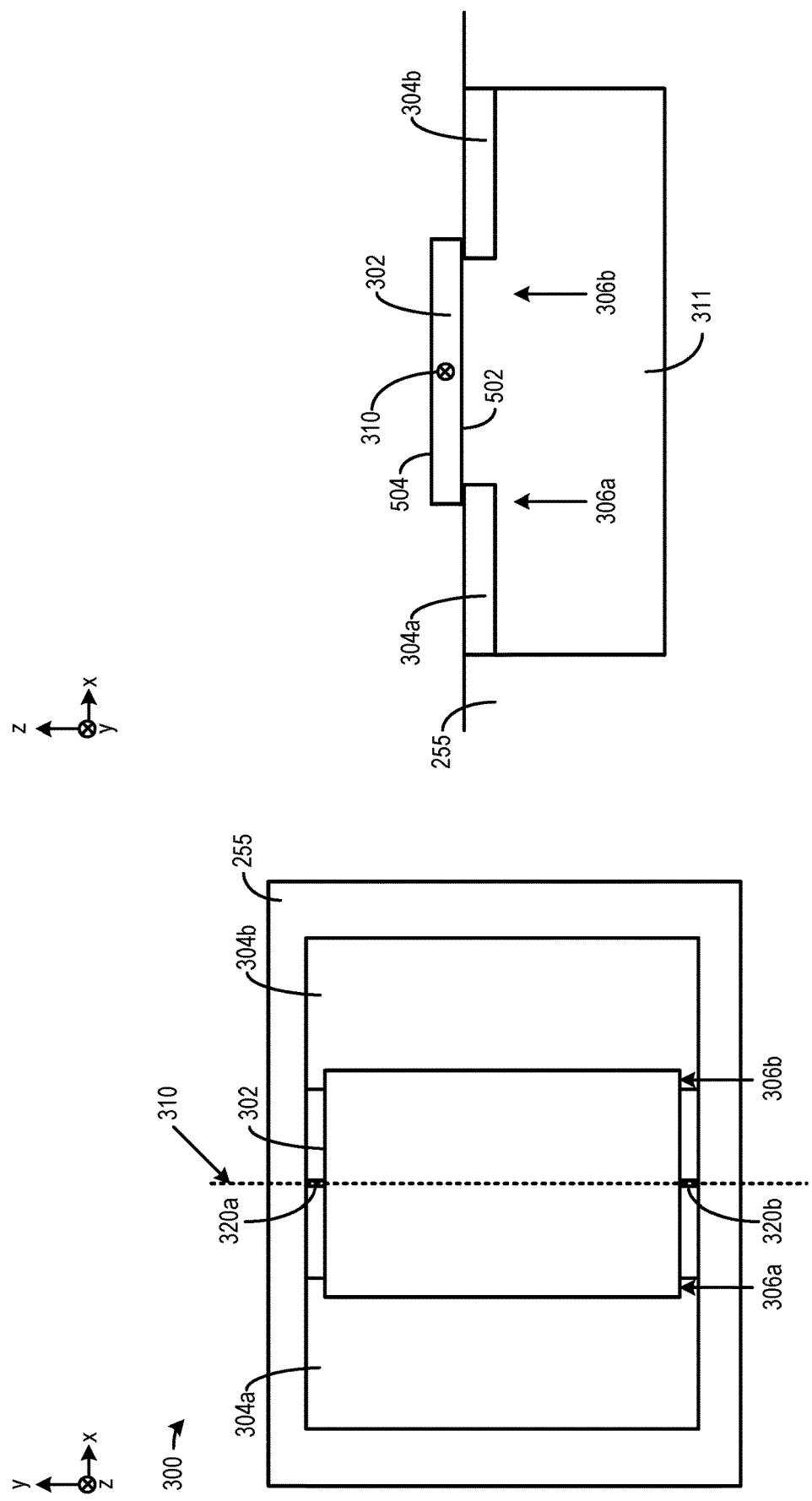
FIG. 5 illustrates an additional example of micro-mirror assembly of FIG. 3A-FIG. 3C, according to examples of the present disclosure.

In another example, as shown in FIG. 5, the piezoelectric actuator can be directly connected to the micro-mirror/ gimbal without a force-transfer connection structure in between. The piezoelectric actuator can be connected to a bottom surface of the micro-mirror (or the gimbal) that is opposite to a light-reflecting surface of the micro-mirror. The connection point between the piezoelectric actuator and the bottom surface of the micro-mirror can be at the end portion of the micro-mirror and away from the rotation axis, such that the force exerted by the piezoelectric actuator can form a torque to rotate the micro-mirror. In some examples, the micro-mirror can be formed from patterning a first layer of silicon material, and the actuator can be formed from patterning a second layer of silicon material (followed by coating a PZT layer). A micro-mirror assembly can be formed by stacking the patterned first layer of silicon material and the patterned second layer of silicon material on the substrate having a cavity such that the actuator and the micro-mirror suspend over the cavity, which provides space for the actuator to bend and for the micro-mirror to rotate.

Figure 6A:
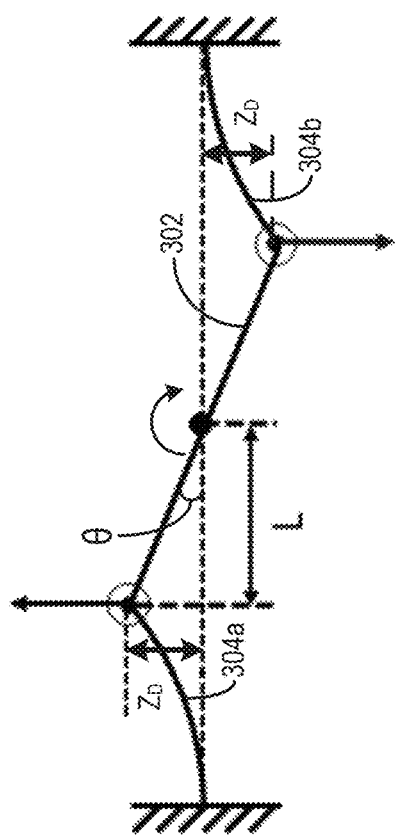
FIG. 6A and FIG. 6B illustrate additional techniques to increase the rotation angle of the micro-mirror assembly of FIG. 3A-FIG. 3C, according to examples of the present disclosure.
Figure 6A:
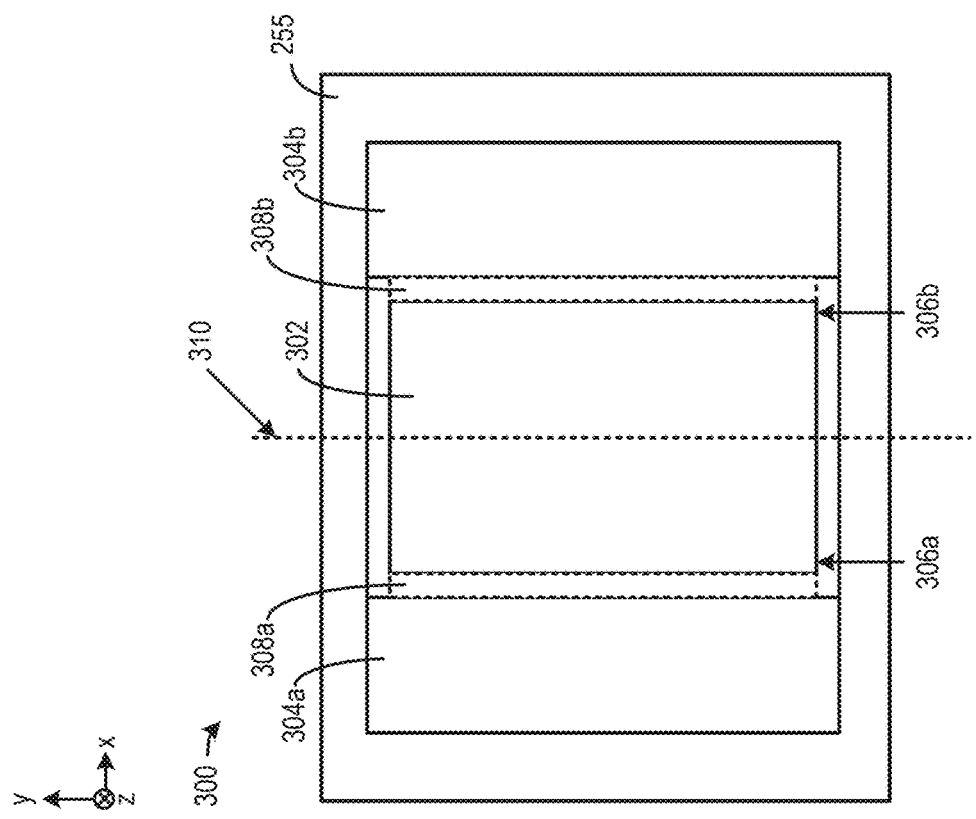
Figure 6B:
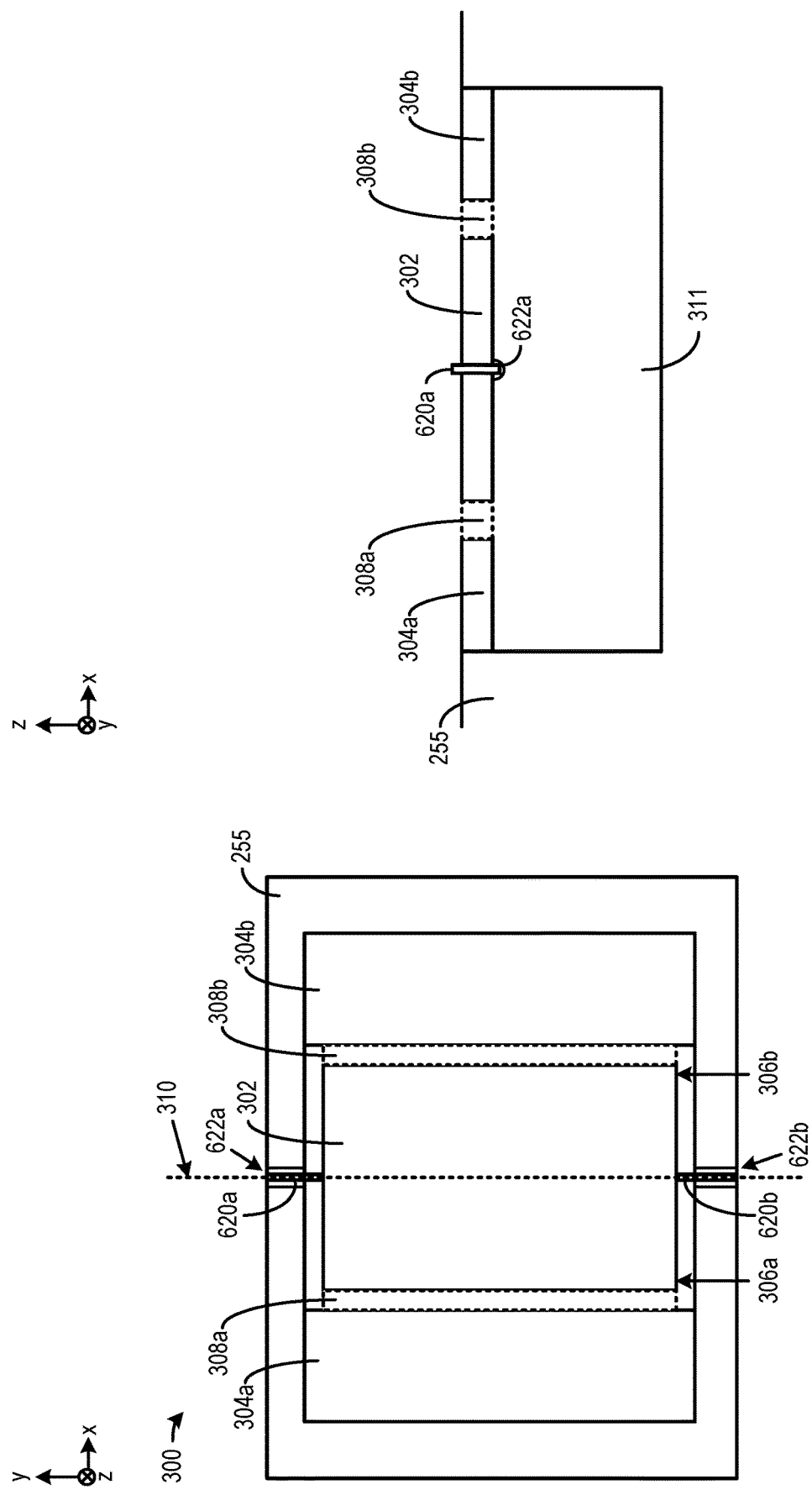

In some examples, the micro-mirror/gimbal can be connected to the substrate via a pair of pivot connection structures (e.g., a torsion bar, a spring) to set the pivot point of rotation, but the stiffness of the pivot connection structures may limit the achievable range of rotation angle of the micro-mirror, as explained above. In some examples, to further increase the maximum rotation angle and the FOV, the pivot connection structures can be removed, as shown in FIG. 6A, to remove the constraint on the maximum rotation angle imposed by the pivot connection structures. The pivot connection structures may not be needed to set the pivot point of rotation if the micro-mirror includes a pair of actuators each displacing an opposite end of the micro-mirror by the same distance but towards opposite directions (e.g., one end goes up, the other end goes down). In some examples, the micro-mirror assembly may also include a pair of pivot connection structures having a very low degree of spring stiffness, and/or a pair of movable connection structures fit within a pair of grooves of the substrate as shown in FIG. 6B, to prevent the movement of the pivot point due to mismatches between the pair of actuators. In all these examples, the overall degree of spring stiffness of the micro-mirror assembly, which can determine the scanning frequency and resolution, can be determined mostly by the degree of spring stiffness of the piezoelectric actuators. With such arrangements, the constraint on the rotation angle imposed by the spring stiffness of pivot connection structures can be removed, which can further increase the rotation angle and the FOV of the light steering system.

Typical System Environment for Certain Examples

FIG. 1 illustrates an autonomous vehicle 100 in which the disclosed techniques can be implemented. Autonomous vehicle 100 includes a LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering transmitter 104 and a receiver 106. Light steering transmitter 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, or an amplitude modulated continuous wave (AMCW) signal. LiDAR module 102 can detect the object based on the reception of light signal 110 and can perform a ranging determination (e.g., a distance of the object) based on a time difference between light signals 108 and 110. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., slowing or stopping) to avoid collision with object 112 based on the detection and ranging of object 112 by LiDAR module 102.

FIG. 2A-FIG. 2E illustrate examples of internal components of a LiDAR module 102. LiDAR module 102 includes a transmitter 202, a receiver 204, and a LiDAR controller 206 which controls the operations of transmitter 202 and receiver 204. Transmitter 202 includes a light source 208 and a collimator lens 210, whereas receiver 204 includes a collimator lens 214 and a photodetector 216. LiDAR module 102 further includes a mirror assembly 212. LiDAR module 102 may further include a beam splitter 213. In LiDAR module 102, transmitter 202 and receiver 204 can be configured as a coaxial system to share mirror assembly 212 to perform light steering operation, with beam splitter 213 configured to reflect incident light reflected by mirror assembly 212 to receiver 204.

Figure 2A:
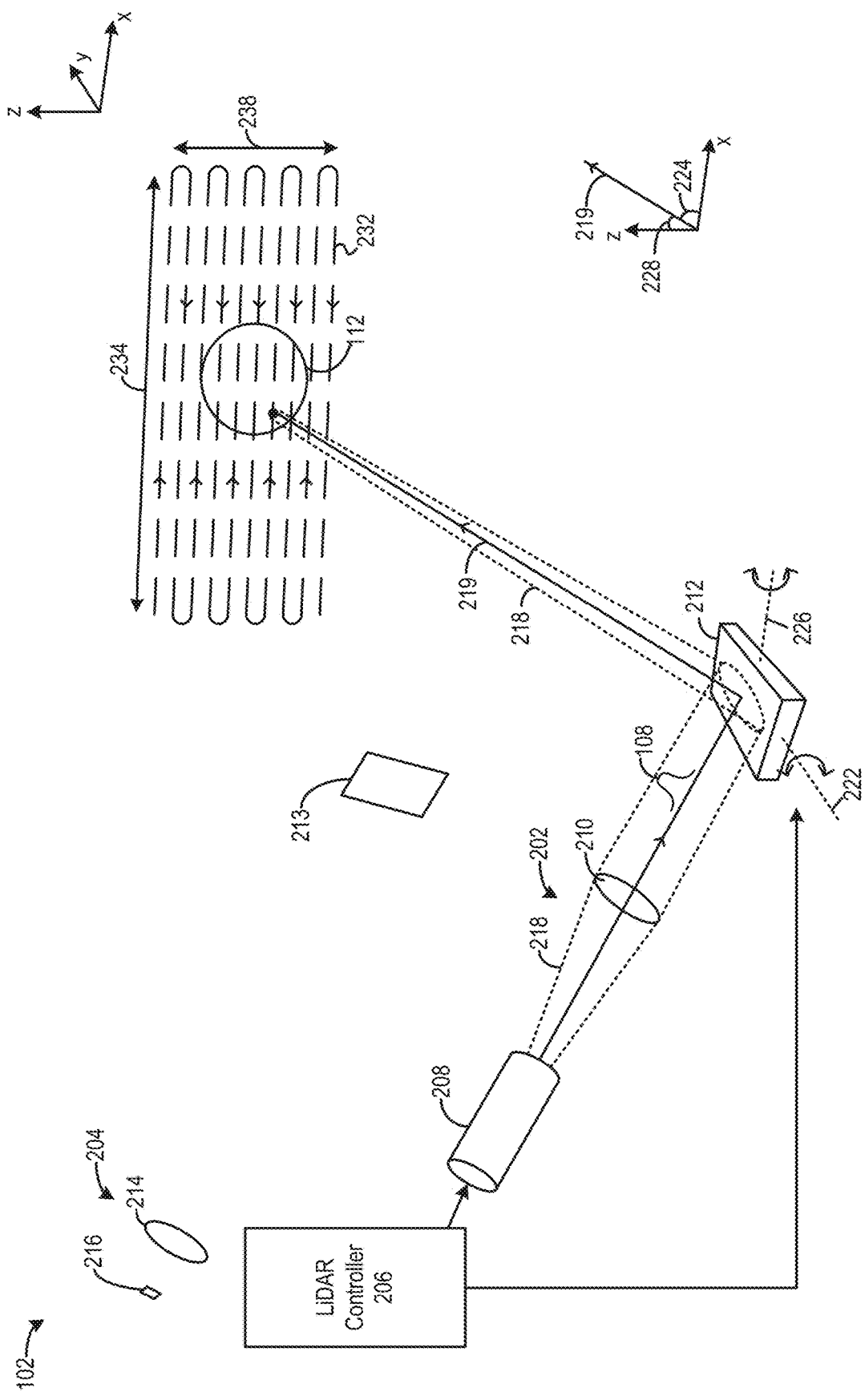
FIG. 2A, FIG. 2B, FIG. 2C, FIG. 2D, and FIG. 2E illustrate examples of a light steering system and properties of internal components of the light steering system, according to certain examples.

FIG. 2A illustrates a light projection operation. To project light, LiDAR controller 206 can control light source 208 (e.g., a pulsed laser diode, a source of FMCW signal, AMCW signal) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light beam 218 to steer it along an output projection path 219 towards object 112. Mirror assembly 212 can include one or more rotatable mirrors. FIG. 2A illustrates mirror assembly 212 as having one mirror, but as to be described below, a micro-mirror array comprising multiple micro-mirror assemblies can be used to provide the steering capability of mirror assembly 212. Mirror assembly 212 further includes one or more actuators (not shown in FIG. 2A) to rotate the rotatable mirrors. The actuators can rotate the rotatable mirrors around a first axis 222 and can rotate the rotatable mirrors along a second axis 226. The rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226, such that the movement of output projection path 219 can follow a scanning pattern 232. A range 234 of movement of output projection path 219 along the x-axis, as well as a range 238 of movement of output projection path 219 along the z-axis, can define an FOV. An object within the FOV, such as object 112, can receive and reflect collimated light beam 218 to form reflected light signal, which can be received by receiver 204.

Figure 2B:
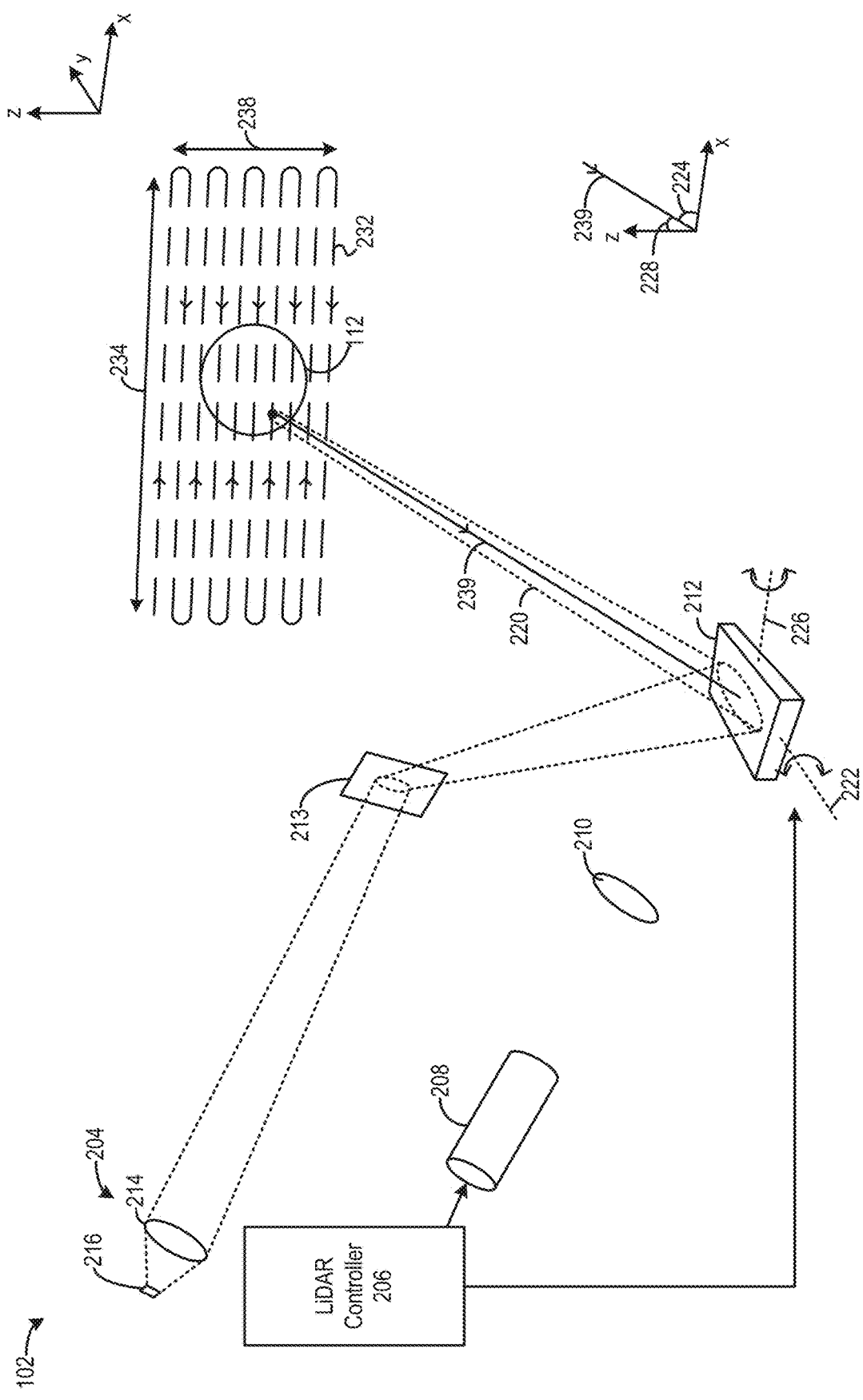

FIG. 2B illustrates a light detection operation. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112, such as light signal 110 generated by the reflection of collimated light beam 218 by object 112, and not receive other signals. As a result, the effect of environment disturbance on the ranging/imaging of the object can be reduced and the system performance can be improved.

Figure 2C:
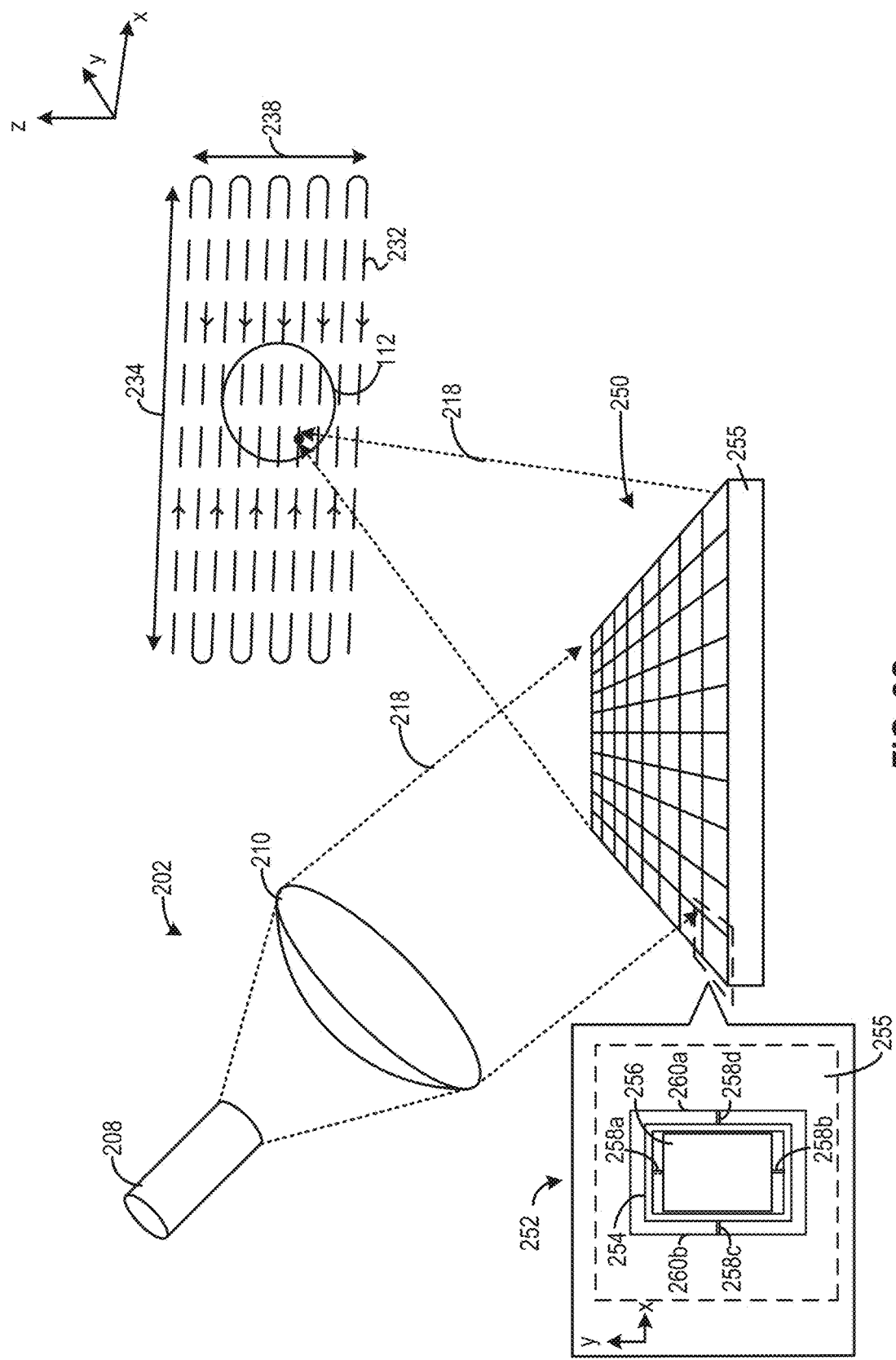
Figure 2D:
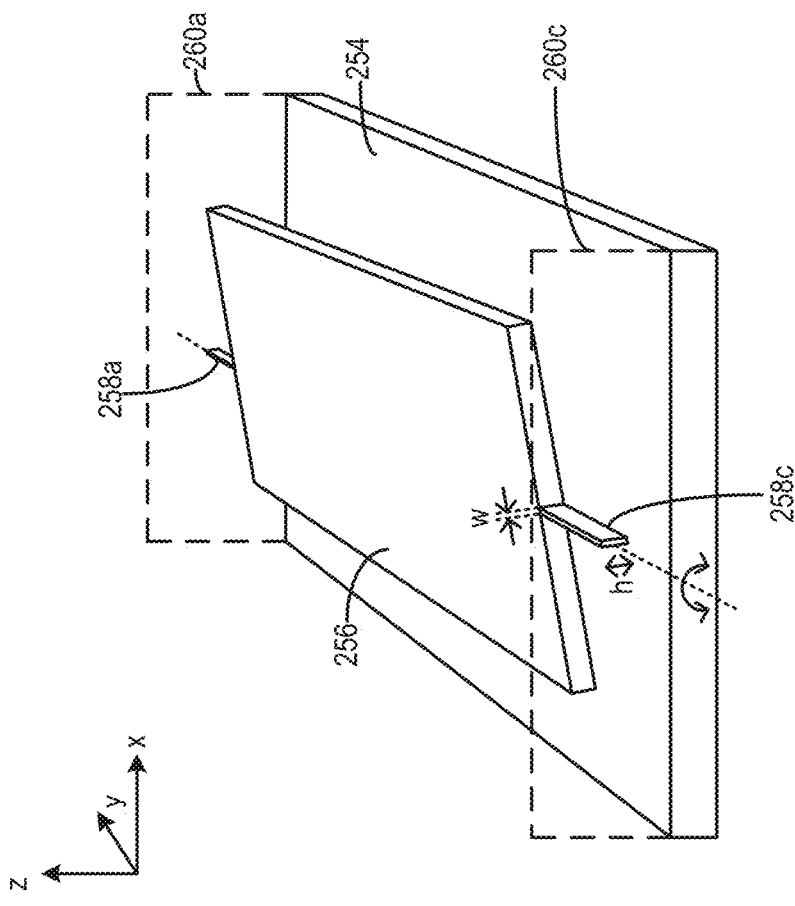
Figure 2D:
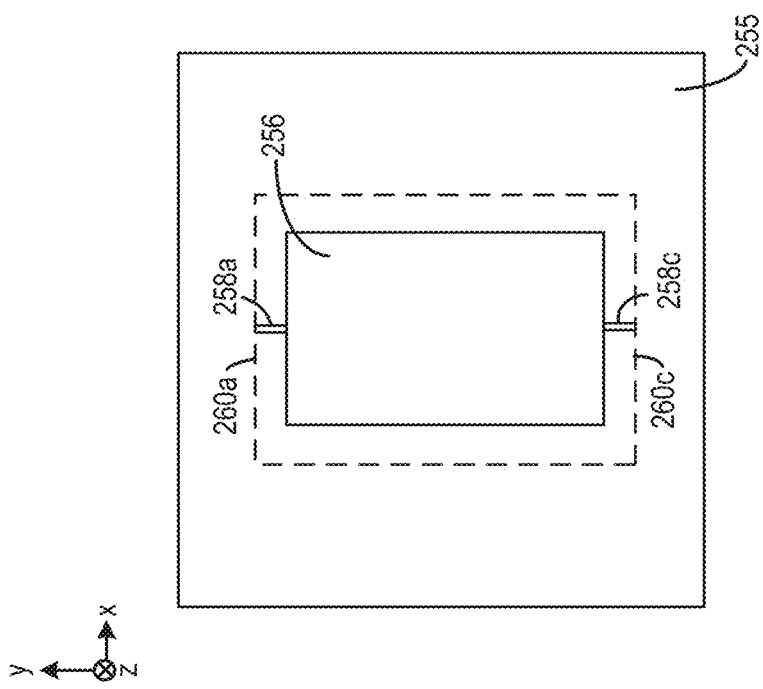

FIG. 2C illustrates an example of a micro-mirror array 250 that can be part of light steering transmitter 202 and can provide the steering capability of mirror assembly 212. Micro-mirror array 250 can include an array of micro-mirror assemblies, including micro-mirror assembly 252. Micro-mirror assembly 252 can include an MEMS implemented on a semiconductor substrate 255. Micro-mirror assembly 252 may include a gimbal/frame 254 and a micro-mirror 256 forming a gimbal structure. Specifically, pivot connection structures 258a and 258b connect micro-mirror 256 to gimbal 254 at a pair of pivot points. Moreover, pivot connection structures 258c and 258d connect gimbal 254 (and micro-mirror 256) to side walls 260a and 260b semiconductor substrate 255 at another pair of pivot points. A pair of pivot connection structures can define a pivot/axis of rotation for micro-mirror 256. For example, pivot connection structures 258a and 258b can define a pivot/axis of rotation of micro-mirror 256 about the y-axis within gimbal 254, whereas pivot connection structures 258c and 258d can define a pivot/axis of rotation of gimbal 254 and micromirror 256 about the x-axis with respect to semiconductor substrate 255.

A micro-mirror assembly 252 can receive and reflect part of light beam 218. Micro-mirror 256 of micro-mirror assembly 252 can be rotated by an actuator of the micro-mirror assembly (not shown in FIG. 2B) at a first angle about the y-axis (around pivot connection structures 258a and 258c) and at a second angle about the x-axis (around connection structures 258b and 258d) to set the direction of output projection path for light beam 218 and to define the FOV, as in FIG. 2A, or to select the direction of input light to be detected by receiver 204, as in FIG. 2B. FIG. 2C illustrates another view of micro-mirror assembly 252 including connection structures 258a and 258c having a width w and a thickness h.

To accommodate the rotation motion of micro-mirror 256, pivot connection structures 258a, 258b, 258c, and 258d are configured to be elastic and deformable. The pivot connection structure can be in the form of, for example, a torsion bar, or a spring, and can have a certain spring stiffness. The spring stiffness of the connection structure can define a torque required to rotate micro-mirror 256 by a certain rotation angle, as follows:

$$\tau = -K\theta \quad \text{(Equation 1)}$$

In Equation 1, $\tau$ represents torque and K represents a spring constant that measures the spring stiffness of the connection structure, whereas $\theta$ represents a target angle of rotation. The spring constant can depend on various factors, such as the material of the connection structure or the cross-sectional area of the connection structure. For example, the spring constant can be defined according to the following equation:

$$K = \frac{k_2 \times G \times w^3 \times h}{L} \quad \text{(Equation 2)}$$

In Equation 2, L is the length of the pivot connection structure, G is the shear modulus of material that forms the connection structure, and $k_2$ is a factor that depends on the ratio between thickness (h) and width (w) given as h/w.

Based on Equations 1 and 2, different torques can be applied to the micro-mirror to achieve different target rotation angles to start the rotation. The actuator can then remove the torque, and the elasticity of the connection structure, defined by the spring constant, can return micro-mirror 256 back to its default orientation to begin the next rotation. The rotation of micro-mirror 256 can be repeated in the form of oscillation. When in a steady state, micro-mirror 256 can rotate at a resonant frequency $\omega$ based on the spring constant of pivot connection structures 258a-d as well as the mass of micro-mirror 256, as follows:

$$\omega = \sqrt{\frac{K}{J}} \quad \text{(Equation 3)}$$

In Equation 3, K is the spring constant of pivot connection structures 258a-d, whereas J is the moment of inertia of micro-mirror 256. The actuator can apply and then remove a torque at the natural frequency of the micro-mirror to maintain the oscillation. During steady state, a torque can be applied at the resonant frequency to overcome the damping to the oscillation. The damping can be caused by various sources, such as air friction encountered by the micro-mirror as the micro-mirror rotates, which introduces air damping. The resonant frequency can also correspond to a frequency of rotation of the micro-mirror to reduce the amount of torque needed to rotate the micro-mirror.

There can be various reasons for increasing the width of pivot connection structures 258a-d and the degree of spring stiffness of pivot connection structures 258a-d. One reason can be due to a large moment of inertia of micro-mirror 256. The moment of inertia of micro-mirror 256 may increase due to an increase in the size (and mass) of micro-mirror 256. The size of micro-mirror 256 can be increased to increase the reflective surface area, which can increase the aperture size and improve the detection range of LiDAR module 102. But with the micro-mirror having a larger moment of inertia, the connection structures need to have a higher spring stiffness to improve the structural integrity of the pivot points, otherwise the connection structure may break due to the repeated rotation of the micro-mirror. In addition, the width of connection structures 258a-d and the degree of spring stiffness (spring constant K) of connection structures 258a-d can be increased, to increase the resonant frequency $\omega$ of rotation of micro-mirror 256. The resonant frequency can be increased to increase the scanning frequency, which can improve the resolution (in time) of the scanning operation. Specifically, with a higher resonant frequency, the micro-mirrors can repeat the scanning operation at a higher rate, which allows the detection/measurement operation of objects to be performed at a higher rate, which can improve the resolution of the detection/measurement operation.

Increasing the overall spring stiffness of the pivot connection structures, however, can reduce the rotation angle of the micro-mirror. Specifically, to rotate the micro-mirror by a certain angle, the spring stiffness needs to be overcome to deform the pivot connection structures. A higher spring stiffness means the micro-mirror rotates by a smaller rotation angle for a given amount of torque. As the maximum amount of force (and torque) provided an actuator is typically limited, increasing the spring stiffness of the pivot connection structures (e.g., to accommodate a larger micromirror) can reduce the maximum rotation angle of the micro-mirror, which can lead to a reduction of the range of rotation angles of the micro-mirror as well as the FOV provided by the micro-mirror array.

Figure 2E:
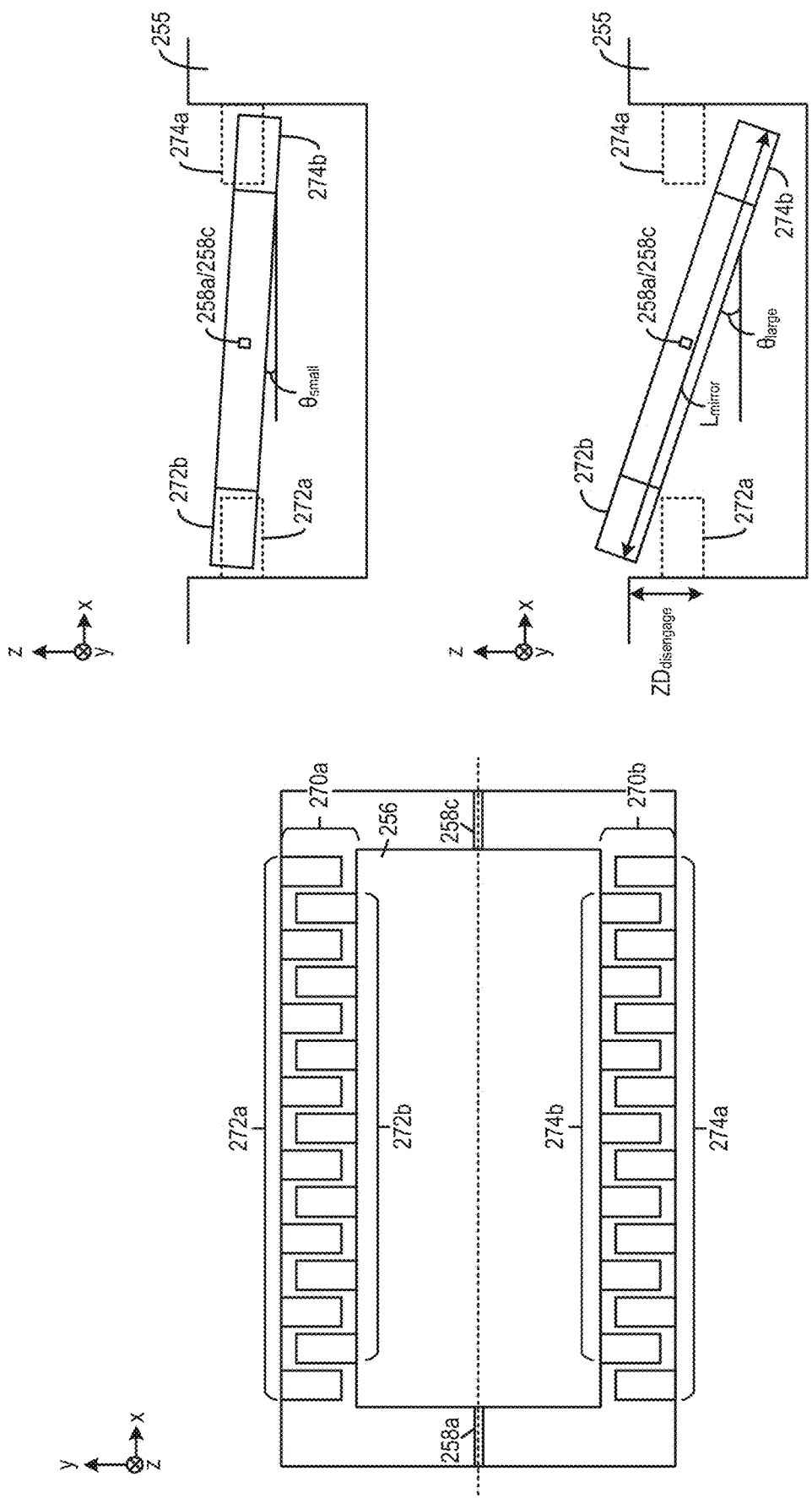

Besides spring stiffness of the pivot connection structures, the maximum rotation angle of the micro-mirror can also be reduced by other attributes of the micro-mirror assembly, such as the structure of the actuator. FIG. 2E illustrates an example of a pair of actuators 270a and 270b. As shown in FIG. 2E, each of actuators 270a and 270b can include a comb drive having two corresponding sets of fingers. Actuator 270a may include a corresponding set of fingers 272a and 272b, whereas actuator 270b may include a corresponding set of fingers 274a and 274b. One set of fingers 272a and 274a, which is static, may be formed on semiconductor substrate 255, whereas the other set of fingers 272b and 274b is formed on opposite edges of the micro-mirror and is movable. When the micro-mirror rotates at a small angle $\theta_{small}$, each corresponding set of fingers 272a-b and fingers 274a-b is in an engaging position where the side surfaces (parallel with the x-z plane) of each corresponding set of fingers overlap. Mutual electrostatic forces between the overlapping surfaces of a corresponding set of fingers can be created when a controller applies a voltage difference across the corresponding set of fingers. The electrostatic force, which can correspond to the voltage difference, can displace the set of movable fingers (e.g., fingers 272b and 274b) from its initial/default positions and rotate micro-mirror 256 by the rotation angle $\theta_{small}$. The electrostatic force can create a torque, which can set the rotation angle $\theta_{small}$ based on the degree of spring stiffness of pivot connection structures 258a/258c.

On the other hand, when the micro-mirror rotates at a large angle $\theta_{large}$, fingers 272b and 274b can be displaced from their initial positions by a large displacement (labeled "$ZD_{disengage}$" in FIG. 2E). As a result, each corresponding set of fingers 272a-b and fingers 274a-b is in a disengaging position where the side surfaces (parallel with the x-z plane) of each corresponding set of fingers no longer overlap. The mutual electrostatic force between each corresponding set of fingers may have reached a maximum. As a result, even when a voltage difference across a corresponding set of fingers increases, the mutual electrostatic force does not increase with the voltage difference, and the sets of movable fingers cannot be displaced further to further increase the rotation angle of micro-mirror 256. As a result, the rotation angle of micro-mirror 256 may have reached a maximum. The maximum rotation angle may be further reduced when the length of micro-mirror 256 (denoted "$L_{mirror}$" in FIG. 2E) increases to increase the aperture as well as the detection range. Specifically, with the length of micro-mirror 256 increased, fingers 272b and 274b can undergo the same displacement $ZD_{disengage}$ and disengage when micro-mirror 256 rotates by an angle smaller than $\theta_{large}$, which reduces the maximum rotation angle of micro-mirror 256.

Example Techniques to Increase Rotation Angle of Micro-Mirror

Figure 3A:
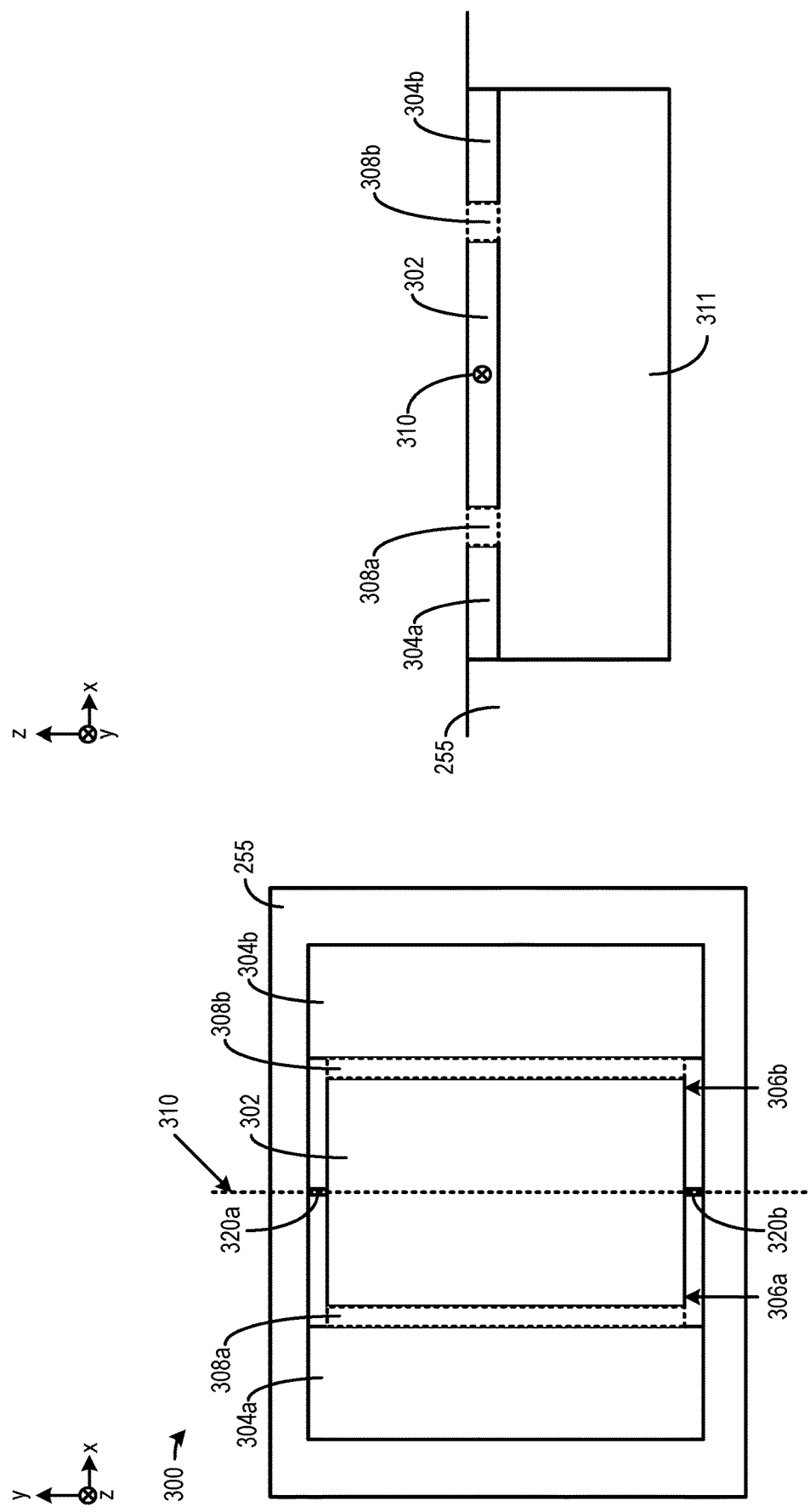
FIG. 3A, FIG. 3B, and FIG. 3C illustrate examples of a micro-mirror assembly having a piezoelectric actuator, according to examples of the present disclosure.
Figure 3B:
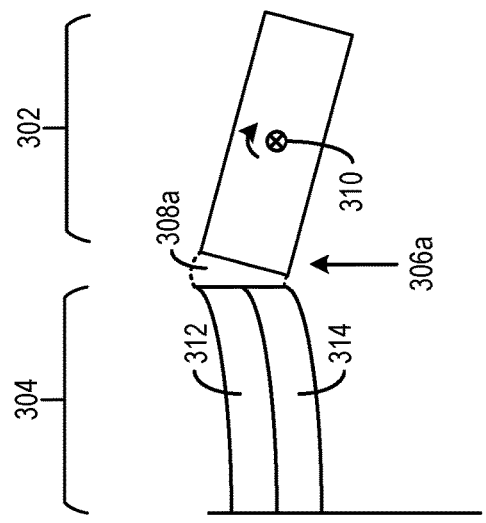
Figure 3B:
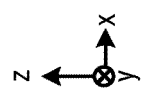
Figure 3B:
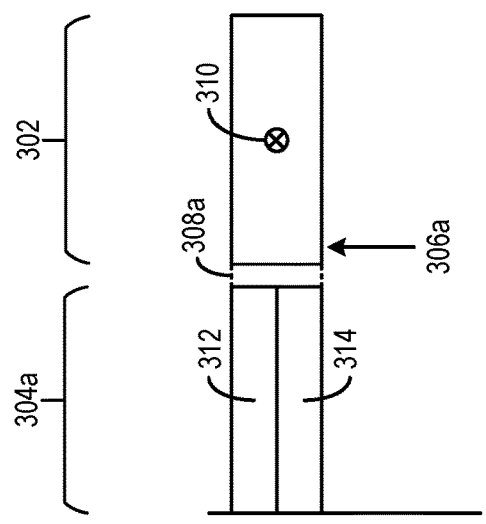
Figure 3B:
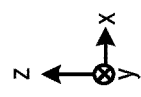
Figure 3C:
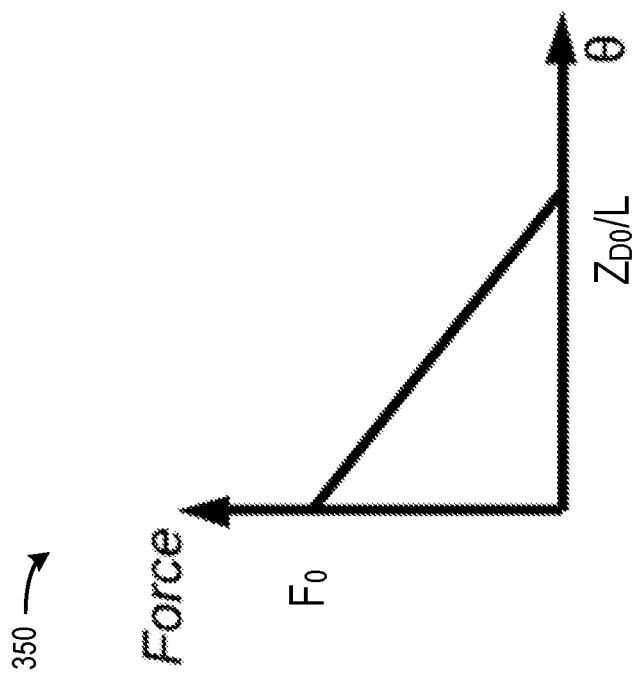
Figure 3C:
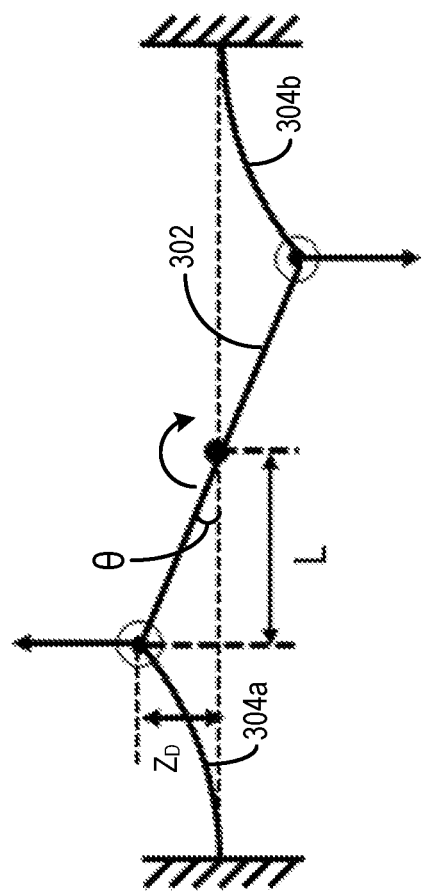

FIG. 3A, FIG. 3B, and FIG. 3C illustrate examples of a micro-mirror assembly that can address at least some of the issues described above. As shown in FIG. 3A-FIG. 3C, a micro-mirror assembly 300 can include a micro-mirror 302 and one or more actuators 304. In FIG. 3A, one or more actuators 304 include a pair of actuators 304a and 304b. One end of each of actuators 304a and 304b is directly connected to substrate 255. Another end of each of actuators 304a and 304b is mechanically connected (which can include direct or indirect physical connection) to opposite end portions of micro-mirror 302, or a gimbal (e.g., gimbal 254 of FIG. 2C) that surrounds micro-mirror 302. For example, actuator 304a is mechanically connected to an end portion 306a of micro-mirror 302 (or of gimbal 254), whereas actuator 304b is mechanically connected to an end portion 306b of micro-mirror 302 (or of gimbal 254).

Each of actuators 304a and 304b can exert a force at, respectively, end portions 306a and 306b to rotate micro-mirror 302 around a rotation axis 310. In some examples, as shown in FIG. 3A, actuator 304a and end portion 306a can be connected via a force-transfer connection structure 308a, whereas actuator 304b and end portion 306b can be connected via a force-transfer connection structure 308b. Force-transfer connection structures 308a and 308b can transfer the forces generated by actuators 304a and 304b to, respectively, end portions 306a and 306b. In some examples, as to be described below, actuator 304a can also be directly connected to end portion 306a, whereas actuator 304b can also be directly connected to end portion 306b, such that the actuators directly exert the forces at the end portions of micro-mirror 302. Actuators 304 and micro-mirror 302 can suspend over a cavity 311, which provides space for micro-mirror 302 to rotate.

Although FIG. 3A illustrates that micro-mirror assembly 300 includes a pair of actuators 304a and 304b, it is understood that micro-mirror assembly 300 can also include a single actuator 304. The single actuator can be mechanically connected to one end portion (one of end portions 306a or 306b) of micro-mirror 302 and can rotate micro-mirror 302 by exerting a force at the end portion of micro-mirror 302. Moreover, in a case where the micro-mirror has multiple rotation axes, as shown in FIG. 2C, micro-mirror assembly 300 can include multiple sets of actuators, with each set including one or more actuators to rotate the micro-mirror around different rotation axes.

Referring to FIG. 3B, actuator 304 (e.g., actuator 304a) can include a piezoelectric actuator which is deformable, in response to a voltage, to bend up or down along an axis perpendicular to a rotation axis 310 of micro-mirror 302 (e.g., along the z-axis) to exert a force at end portion 306a of micro-mirror 302. The force can create a torque to rotate the micro-mirror. As piezoelectric actuator 304a bends, it can displace end portion 306a of micro-mirror 302, which causes the micro-mirror to rotate around rotation axis 310. Piezoelectric actuator 304a may include a PZT layer 312 formed on an elastic material layer 314, such as silicon. The PZT layer can expand or contract in response to a voltage, which causes piezoelectric actuator 304a to bend up or down, which then rotates micro-mirror 302 clockwise (e.g., when piezoelectric actuator 304a bends up) or counter-clockwise (e.g., when piezoelectric actuator 304a bends down). Unlike the case of comb drive where there is no physical connection between the two sets of fingers and where the comb drive may be unable to exert a force on the micro-mirror when the two sets of fingers disengage, in micro-mirror assembly 300, piezoelectric actuators 304a and 304b can remain mechanically connected with micro-mirror 302 as the micro-mirror rotates. Such arrangements allow the piezoelectric actuator to continue to exert the torque and set the rotation angle of the micro-mirror even when the opposite ends of the micro-mirror experience a large displacement from their initial positions. As a result, the achievable range of rotation angle of the micro-mirror, as well as the FOV, can be increased, while the range of rotation angle is not (or less) limited by the dimension of the micro-mirror, which allows improvements in both the FOV and detection range of the light steering system.

Referring back to FIG. 3A, in some examples, micro-mirror assembly 300 may include a pair of pivot connection structures 320a and 320b to mechanically connect micro-mirror 302 (or a gimbal that surrounds micro-mirror 302) to substrate 255. The pair of pivot connection structures 320a and 320b can set a pair of pivot points that align with rotation axis 310 around which micro-mirror 302 rotates. In some examples, as to be described below, if the micro-mirror includes a pair of actuators each displacing an opposite end of the micro-mirror by the same distance but towards opposite directions (e.g., one end goes up, the other end goes down), micro-mirror assembly 300 may not need pivot connection structures 320a and 320b to set the pivot points. In such examples, micro-mirror assembly 300 may not include pivot connection structures 320a and 320b or may include pivot connection structures 320a and 320b that are weakly connected to or movable at the pivot points. Such arrangements can reduce the constraint on the rotation of micro-mirror 302 caused by the stiffness of pivot connection structures and can further increase the maximum rotation angle of micro-mirror 302.

FIG. 3C illustrates various physical attributes of micro-mirror assembly 300 that determine the rotation angle and frequency of micro-mirror 302. In FIG. 3C, actuator 304a can have a default bending shape, and a blocking force $F_0$ is required to bend actuator 304a to set it straight, such that the displacement of end portion 306a from its initial/default position becomes zero. Referring to FIG. 3C, the force provided by actuator 304a can be expressed as follows:

$$F=F_0-K_A Z_D \quad \text{(Equation 4)}$$

In Equation 4, F can represent the force provided by piezoelectric actuator 304a, $F_0$ can represent the blocking force when the displacement of end portion 306a is forced to be zero, and $K_A$ can represent the degree of spring stiffness of piezoelectric actuator 304a which is largely attributed to the degree of spring stiffness of elastic layer 314 (e.g., silicon), whereas $Z_D$ represents the displacement at end portion 306a.

With the distance between piezoelectric actuator 304a and rotation axis 310 equal to L, and rotation angle θ being small, the relation between θ and $Z_D$ can be expressed as follows:

$$\theta \approx Z_D/L \quad \text{(Equation 5)}$$

Referring to graph 350 of FIG. 3C, when rotation angle θ equals zero, which means end portion 306a has zero displacement, the force exerted by actuator 304a (F) equals the blocking force $F_0$. On the other hand, actuator 304a exerts a zero force F when actuator 304a is in the default bending shape, in which case end portion 306a displaces from its initial position by a distance $Z_{D0}$, which gives rise to a rotation angle of $Z_{D0}/L$ according to Equation 5.

The torque on micro-mirror 302 under a rotation angle of θ, exerted by actuator 304a, can be expressed as:

$$T=K_t\theta-FL=K_t\theta-L(F_0-K_A Z_D) \quad \text{(Equation 6)}$$

In Equation 6, T represents the total torque on the micro-mirror, whereas $K_t$ represents the spring stiffness of pivot connection structures 320a and 320b. The micro-mirror maintains a rotation angle of θ when applied force equals the blocking force $F_0$, such that the total torque T equals zero.

Equation 6 can be rewritten as follows by combining with Equation 5:

$$T=(K_t+K_A L^2)\theta-F_0 L \quad \text{(Equation 7)}$$

From Equation 7, the overall spring stiffness K of micro-mirror assembly 300, attributed to the spring stiffness $K_A$ of actuator 304a and the spring stiffness of pivot connection structures 320a and 320b, can be expressed as follows:

$$K=K_t+K_A L^2 \quad \text{(Equation 8)}$$

The rotation angle θ can be related to the overall spring stiffness K as follows:

$$\theta = \frac{F_0 L}{K_t + K_A L^2} = \frac{F_0 L}{K} \quad \text{(Equation 9)}$$

In addition, the resonant frequency of micro-mirror 302, which can determine the rotation frequency as well as the scanning frequency of the light steering system, can be determined based on Equation 8 and Equation 3 described above.

As described in FIG. 3A, in some examples, micro-mirror assembly 300 includes force-transfer connection structures 308 connected between actuators 304 and micro-mirror 302. FIG. 4A-FIG. 4B illustrate various placements of force-transfer connection structures 308. In FIG. 4A and FIG. 4B, the shapes of force-transfer connection structures 308 are provided to simplify illustration only and may or may not represent the actual shapes of the force-transfer connection structures. In some examples, as shown in FIG. 4A, connection structures 308a and 308b can be connected to first side surfaces 402a and 402b of micro-mirror 302 (or of the gimbal) that intersect with rotation axis 310. In some examples, as shown in FIG. 4B, connection structures 308a and 308b can be connected to second side surfaces 404a and 404b of micro-mirror 302 (or of the gimbal) that are in parallel with rotation axis 310. In both FIG. 4A and FIG. 4B, force-transfer connection structures 308a and 308b are connected to, respectively, end portions 306a and 306b of micro-mirror 302 away from rotation axis 310, such that a force exerted by the force-transfer connection structures (transferred from the actuators) can create a torque around rotation axis 310 of micro-mirror 302.

FIG. 4C and FIG. 4D illustrate examples of force-transfer connection structure 308. FIG. 4C illustrates a side view and a three-dimensional view of an example of connection structure 308. As shown in FIG. 4C, connection structure 308 (e.g., connection structure 308a) can include a first bar 410, a second bar 412, and a frame structure 414 connected between first bar 410 and second bar 412. First bar 410 is directly connected to an actuator (e.g., actuator 304a) at a first connection point 416, whereas the second bar is directly connected to micro-mirror 302 (or gimbal) at a second connection point 418 which can be on first side surfaces 402a/402b, as shown in FIG. 4C, or on second side surfaces 404a/404b, as shown in FIG. 4A-FIG. 4B. Opposite ends of first bar 410 and second bar 412 are directly connected to two sides of frame structure 414. Although FIG. 4C illustrates that frame structure 414 has a rectangular shape, it is understood that frame structure 414 can have other shapes, such as a circular shape, an oval shape, or a diamond shape.

In some examples, force-transfer connection structure 308 of FIG. 4C and FIG. 4D can have a relatively low rotational spring stiffness (along a direction represented by a curved arrow A) and would only allow a rotation of the micro-mirror 302 relative to actuators (304a or 304b). At the same time, force-transfer connection structure 308 can also have a relatively high linear spring stiffness (along represented by arrow B) to keep both the connection points (416 and 418) at the same distance relative to the mirror surface.

Referring to the right of FIG. 4C, as actuator 304a bends up, first and second connection points 416 and 418 may move away from each other along a horizontal direction (e.g., along the x-axis or y-axis), whereas when actuator 304a bends down, first and second connection points 416 and 418 may move towards each other along the horizontal direction. Yet in both cases, connection points 416 and 418 move up or down along a vertical direction (e.g., along the z-axis). To accommodate the different degrees of relative movements between connection points 416 and 418, first bar 410 and second bar 412 can be configured to have a high degree of spring stiffness in all directions. Moreover, frame structure 414 can be configured to have a high degree of spring stiffness along the vertical direction, and a low degree of sprint stiffness along the horizontal direction. With such arrangements, as micro-mirror 302 rotates, frame structure 414 can deform along the horizontal direction to allow the two connection points 416 and 418 to move towards or away from each other along the horizontal direction, yet the entire force-transfer connection structure 308 is more rigid along the vertical direction to force the two connection points 416 and 418 to move up or down together, so as to transfer a bending force of actuator 304a to micro-mirror 302 to provide the torque.

FIG. 4D illustrates a side view and a three-dimensional view of another example of connection structure 308. As shown in FIG. 4D, connection structure 308 (e.g., connection structure 308a) can include a deformable bar 420 having a serpentine or spring shape. One end of the deformable bar is directly connected to the actuator (e.g., actuator 304a) at first connection point 416, whereas another end of the deformable bar is directly connected to micro-mirror 302 (or gimbal) at a second connection point 418 which can be on first side surfaces 402a/402b, as shown in FIG. 4D, or on second side surfaces 404a/404b, as shown in FIG. 4A-FIG. 4B. Just like frame structure 414 of FIG. 4C, deformable bar 420 has different degrees of spring stiffness along different directions. As micro-mirror 302 rotates, deformable bar 420 can deform along the horizontal direction to allow the two connection points 416 and 418 to move towards or away from each other along the horizontal direction, yet deformable bar 420 is also more rigid along the vertical direction to force the two connection points 416 and 418 to move up or down together, so as to transfer a bending force of actuator 304a to micro-mirror 302 to provide the torque.

FIG. 5 illustrates an example of micro-mirror assembly 300 in which actuators 304 are directly connected to micro-mirror 302 (or the gimbal that surrounds micro-mirror 302). In FIG. 5, piezoelectric actuators 304a and 304b can be connected to a bottom surface 502 of micro-mirror 302. Bottom surface 502 is opposite to a light-reflecting surface 504 of micro-mirror 302. Piezoelectric actuators 304a and 304b can be connected to bottom surface 502. The connection points between piezoelectric actuators 304a and 304b and bottom surface 502 of micro-mirror 302 can be at end portions 306a and 306b of the micro-mirror and away from the rotation axis, such that the force exerted by the piezoelectric actuator can form a torque to rotate the micro-mirror.

As explained above, in some examples, micro-mirror 302 can be connected to substrate 255 via a pair of pivot connection structures 320a and 320b (e.g., a torsion bar, a spring) to set the pivot point of rotation. But the spring stiffness of the pivot connection structures may limit the achievable range of rotation angle of the micro-mirror. For example, referring to Equation 9 (reproduced below), the rotation angle θ reduces when the overall spring stiffness K increases. The rotation angle θ will be further reduced when the dimension of micro-mirror 302 increases to increase detection range, which leads to a large L, and/or when the spring stiffness of the pivot connection structures $K_t$ increases.

$$\theta = \frac{F_0 L}{K_t + K_A L^2} = \frac{F_0 L}{K} \quad \text{(Equation 9)}$$

System stiffness K is determined by the resonant frequency, for a fixed resonant frequency, K is a constant. The driving force $F_0$ is proportional to the stiffness of actuator $K_A$ (i.e. stiffer actuator can provide more force). To achieve a larger rotation angle, $K_A$ can be made as large as possible to increase $F_0$, since $K_A L^2 + K_t$ is constant, while $K_t$ can be reduced as much as possible to increase the rotation angle and FOV.

In some examples, to further increase the rotation angle and the FOV, the pivot connection structures can be removed. Referring to Equation 9, with the pivot connection structures removed, the rotation angle θ is no longer constrained by the spring stiffness of the pivot connection structures $K_t$. Rotation angle θ can be related to blocking force $F_0$ and spring stiffness of actuator $K_A$ as follows:

$$\theta = \frac{F_0}{K_A L} \quad \text{(Equation 10)}$$

FIG. 6A illustrates an example of micro-mirror assembly 300 that does not include pivot connection structures between substrate 255 and micro-mirror 302, to further increase the rotation angle. In FIG. 6A, pivot connection structures may not be needed to set the pivot point of rotation, if actuators 304a and 304b each displace an opposite end of micro-mirror 302 by the same distance $Z_D$ but towards opposite directions (e.g., one end goes up, the other end goes down) at any given time.

In some examples, instead of having no pivot connection structure, micro-mirror assembly 300 may include a pair of pivot connection structures having a very low degree of spring stiffness connected between micro-mirror 302 and substrate 255. Micro-mirror assembly 300 may also include a pair of movable connection structures 620a and 620b fit within a pair of grooves 622a and 622b of the substrate, as shown in FIG. 6B. All these arrangements can be provided to prevent the movement of the pivot point due to mismatches between the pair of actuators.

Figure 7A:
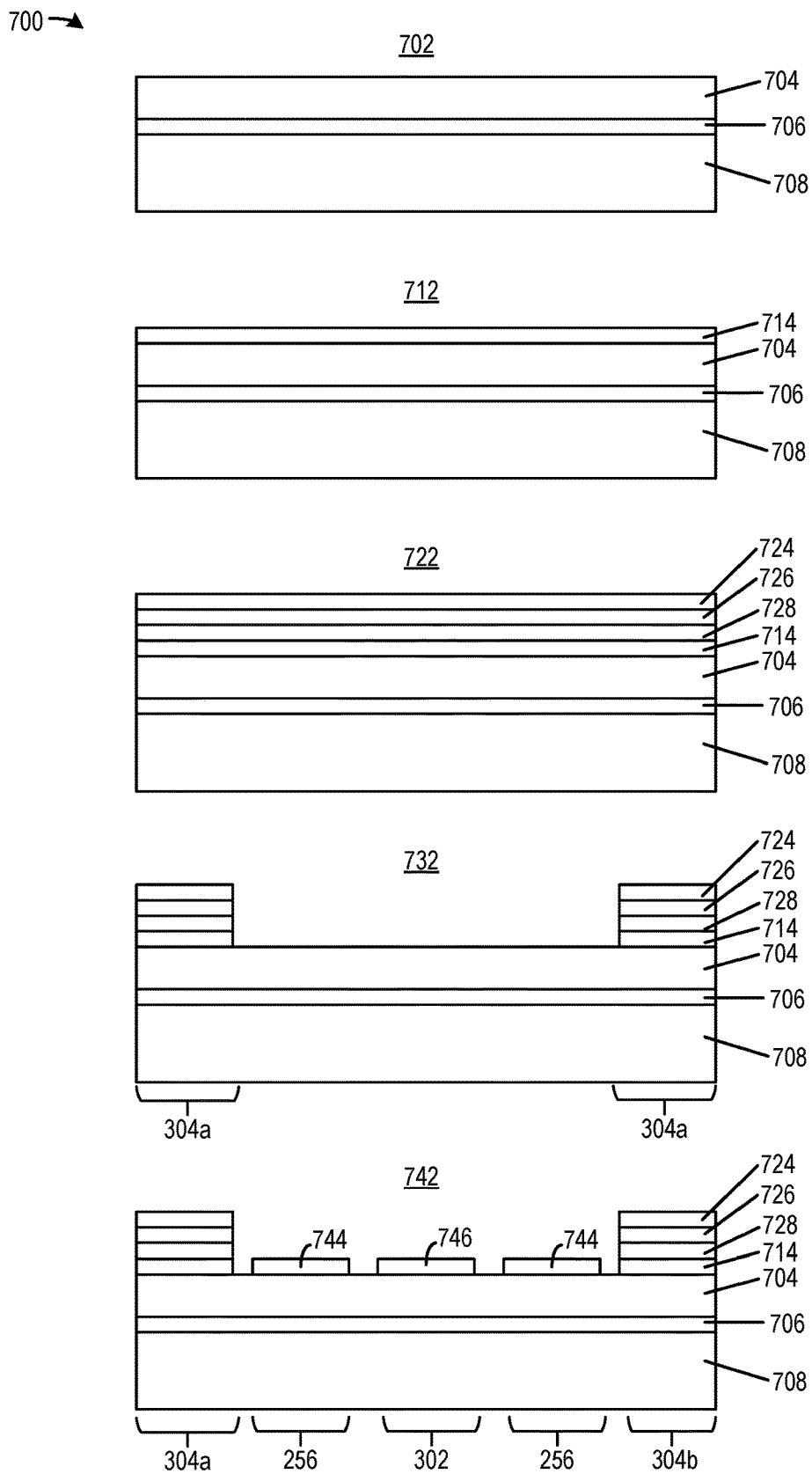
FIG. 7A, FIG. 7B, and FIG. 7C illustrate examples of fabrication processes to fabricate the example micro-mirror assembly of FIG. 3A-FIG. 3C.
Figure 7B:
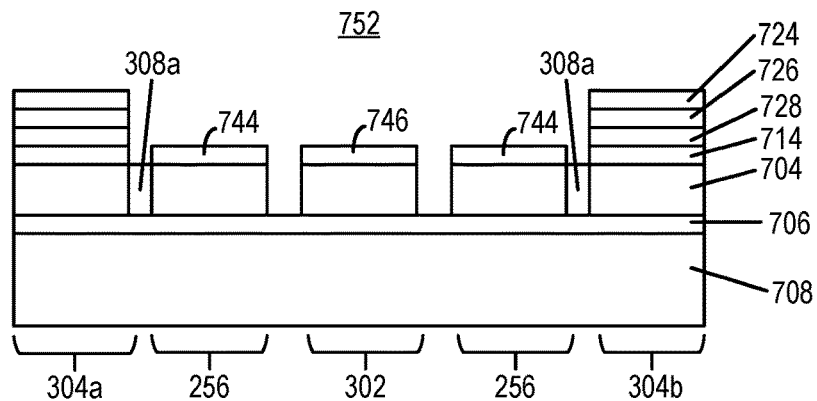
Figure 7B:
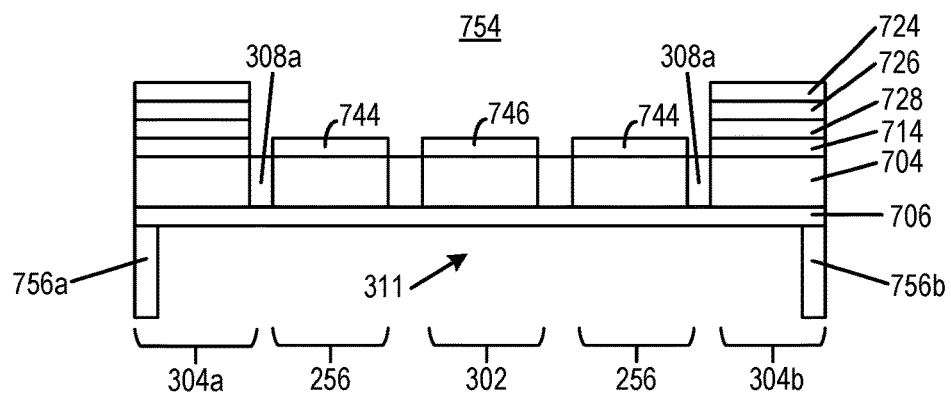
Figure 7B:
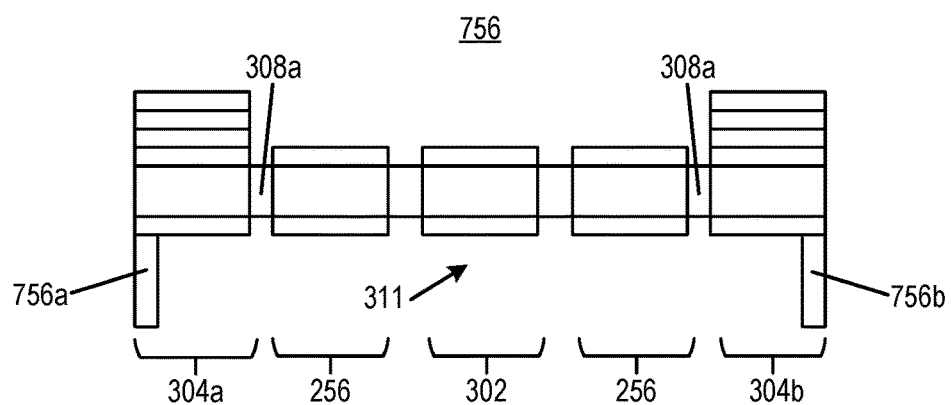
Figure 7C:
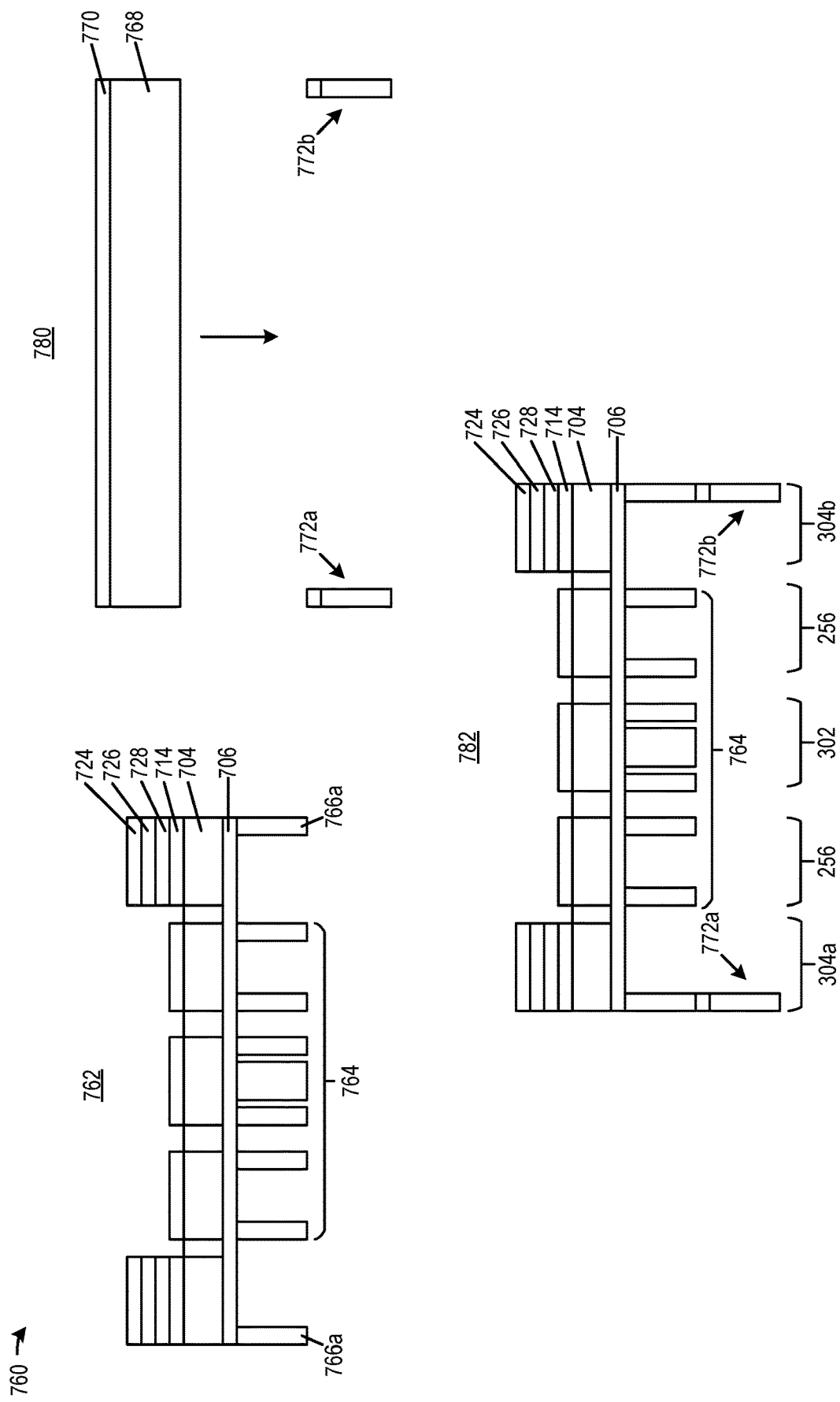

FIG. 7A, FIG. 7B, and FIG. 7C illustrate example fabrication process of fabricating micro-mirror assembly 300 of FIG. 3A-FIG. 3C. FIG. 7A and FIG. 7B illustrates an example fabrication process 700.

Referring to FIG. 7A, fabrication process 700 can start with step 702 with a silicon on insulator wafer comprising a first silicon layer 704, an insulator 706 (e.g., silicon dioxide), and a second silicon layer 708 forming a stack.

In step 712, another layer of insulator 714 can be deposited on first silicon layer 702.

In step 722, a top electrode layer 724 (e.g., a conductor such as copper), a lead zirconate titanate (PZT) layer 726, and a bottom electrode layer 728 (e.g., copper) can be deposited on insulator layer 714.

In step 732, the electrode and PZT layers can be patterned to over regions corresponding to actuators 304a and 304b.

In step 742, anti-reflecting layers 744 and metallic layer 746 can be deposited over regions corresponding to gimbal 256 and micro-mirror 302.

Referring to FIG. 7B, in step 752, first silicon layer 704 can be patterned (e.g., based on a deep reactive-ion etching process) to form actuators 304a and 304b, connection structures 308a and 308b, gimbal 256, and micro-mirror 302. In some examples, pivot connection structures 320a and 320b can also be formed in step 752.

In step 754, a back-side etching operation can be performed on second silicon layer 708 to form wall structures 756a and 756b to enclose cavity 311, followed by the patterning of insulator layer 706 to complete the formation of actuators 304a and 304b, connection structures 308a and 308b, gimbal 256, and micro-mirror 302, in step 756.

FIG. 7C illustrates an example process 760 of forming a micro-mirror assembly 300 in which micro-mirror 302 and gimbal 256 each has a back-side support structure to improve rigidity and to reduce moment of inertia. Referring to FIG. 7C, after step 742 of FIG. 7A is performed, step 762 can be performed, which includes a back-side etching operation on second silicon layer 708 to form back-side support structure 764 under micro-mirror 302 and gimbal 256, and to form wall structures 766a and 766b. On the other hand, a back-side etching operation can be performed on a carrier wafer comprising a silicon layer 768 and an insulator layer 770 to form wall structures 772a and 772b, in step 780.

In step 780, wall structures 766a and 766b can be bonded on, respectively, wall structures 772a and 772b to form micro-mirror assembly 300, followed by the patterning of insulator layer 706 to complete the formation of actuators 304a and 304b, connection structures 308a and 308b, gimbal 256, and micro-mirror 302 (not shown in FIG. 7C).

Figure 8:
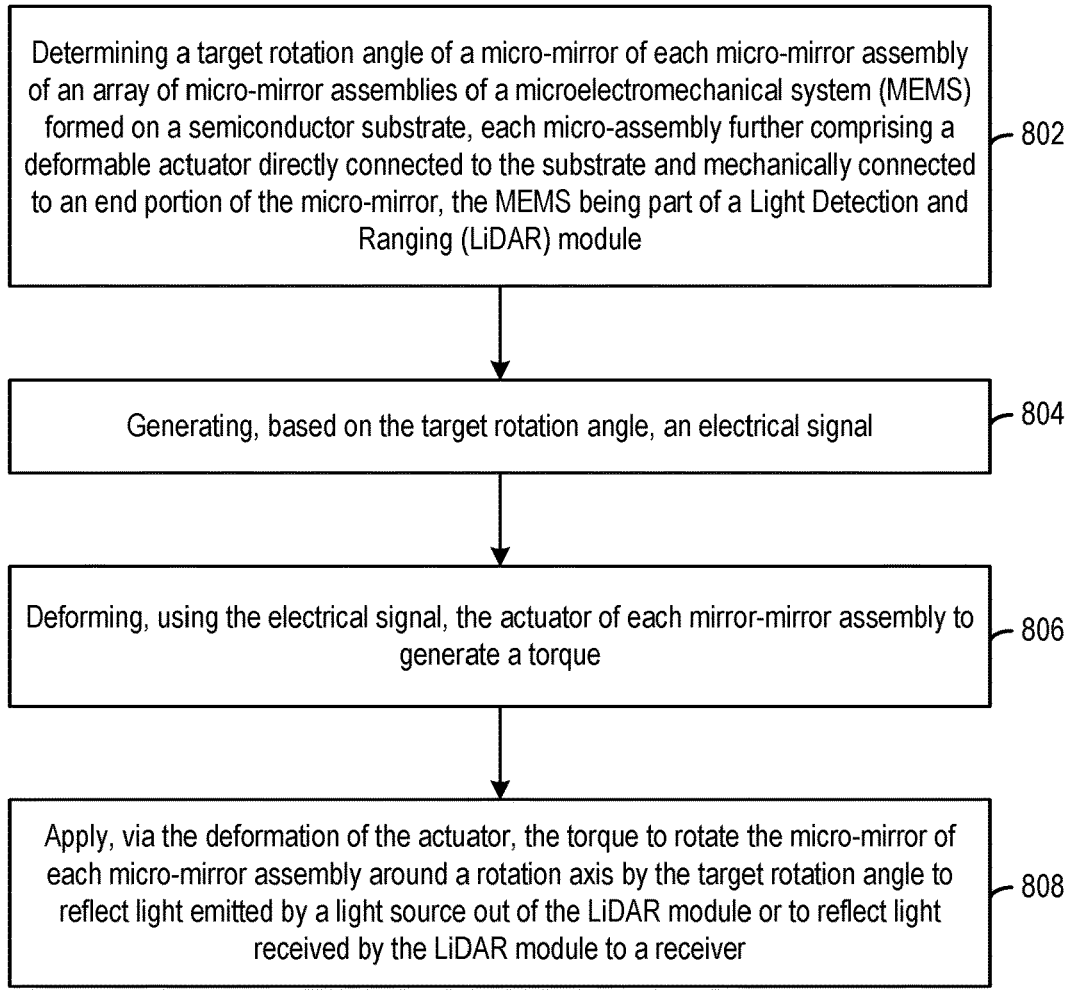
FIG. 8 illustrates an example of a method of operating a Light Detection and Ranging (LiDAR) module, according to examples of the present disclosure.

FIG. 8 illustrates a method 800 of operating a Light Detection and Ranging (LiDAR) module, such as LiDAR module 102 of FIG. 1. Method 800 can be performed by a controller of the LiDAR module. The LiDAR module comprises a microelectromechanical system formed on a semiconductor substrate. The MEMS comprises an array of micro-mirror assemblies. Each micro-mirror assembly, such as micro-mirror assembly 300 of FIG. 3A-FIG. 6B, includes a micro-mirror (e.g., micro-mirror 302) and one or more deformable actuators, such as piezoelectric actuators 304a and 304b. Each piezoelectric actuator is directly connected to the semiconductor substrate and mechanically connected to an end portion of the micro-mirror. In some examples, the actuator is connected to the end portion via a force-transfer connection structure, as shown in FIG. 4A-FIG. 4D. In some examples, the actuator is connected to the end portion directly, as shown in FIG. 5. In some examples, the micro-mirror assembly comprises a gimbal surrounding the micro-mirror, and the actuator can be mechanically connected to the gimbal.

In step 802, the controller can determine a target rotation angle. The target rotation angle can be determined based on, for example, a scanning pattern (e.g., scanning pattern 232).

In step 804, the controller can generate an electrical signal based on the target rotation angle. The electrical signal can be based on, for example, a relationship between an applied voltage across the electrodes of the actuator and a blocking/bending force (e.g., $F_0$) of the actuator, as well as the relationship between the target angle of rotation and $F_0$ as shown in Equation 9.

In step 806, the controller can deform, using the electrical signal the actuator of each mirror-mirror assembly to generate a torque.

In step 808, the controller can apply, via the deformation of the actuator, the torque to rotate the micro-mirror of each micro-mirror assembly around a rotation axis by the target rotation angle to reflect light emitted by a light source out of the LiDAR module, as shown in FIG. 2A, or to reflect light received by the LiDAR module to a receiver, as shown in FIG. 2B. The torque can be applied to the micro-mirror either directly or via a force-transfer connection structure.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims. For instance, any of the examples, alternative examples, etc., and the concepts thereof may be applied to any other examples described and/or within the spirit and scope of the disclosure.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning including, but not limited to) unless otherwise noted. The term "connected" is to be construed as partly or wholly contained within, attached to, or joined together, even if there is something intervening. The phrase "based on" should be understood to be open-ended and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples or exemplary language (e.g., "such as") provided herein is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. An apparatus, the apparatus being part of a Light Detection and Ranging (LiDAR) module of a vehicle and comprising:
   a semiconductor integrated circuit comprising a microelectromechanical system (MEMS) and a substrate, the MEMS comprising an array of micro-mirror assemblies, each micro-mirror assembly comprising:
     a micro-mirror;
     an actuator directly connected to the substrate and mechanically connected to an end portion of the micro-mirror spaced from a rotation axis of the micro-mirror and situated beyond a planar extension in an x dimension and y dimension of the micro-mirror, the actuator configured to deform in response to an electrical signal and generate a corresponding torque that rotates the micro-mirror around the rotation axis to reflect light emitted by a light source out of the LiDAR module or to reflect light received by the LiDAR module to a receiver, wherein the actuator comprises a piezoelectric actuator deformable to bend up or down along a first axis perpendicular to the rotation axis of the micro-mirror to exert the torque;

a deformable force-transfer connection structure directly connected to the actuator and mechanically connected to the micro-mirror;

wherein the actuator is configured to exert the torque to the micro-mirror via the deformable force-transfer connection structure; and wherein the deformable force-transfer connection structure deforms when the micro-mirror rotates;

wherein the deformable force-transfer connection structure comprises a first bar, a second bar, and a frame structure between the first bar and the second bar, the first bar being directly connected to the actuator, the second bar being mechanically coupled to the micro-mirror, and the frame structure having one of a larger dimension than the first and second bars and forming an enclosed structure, and being directly connected to each of the first bar and the second bar at, respectively, a first connection point and a second connection point; and wherein a frequency of rotation of the micro-mirror is determined mostly based on a degree of spring stiffness of the actuator.

2. The apparatus of claim 1, wherein the mechanical connection between the actuator and the micro-mirror comprises the actuator being coupled to the micro-mirror through a gimbal, with the actuator directly connected to a gimbal surrounding the micro-mirror, the gimbal being directly connected to the micro-mirror.

3. The apparatus of claim 1, wherein the deformable force-transfer connection structure is mechanically connected to a side of the micro-mirror that intersects the rotation axis.

4. The apparatus of claim 1, wherein the deformable force-transfer connection structure is mechanically connected to a side of the micro-mirror parallel with the rotation axis.

5. The apparatus of claim 1, wherein the frame structure has a first degree of spring stiffness along a first direction to allow the first connection point to move with respect to the second connection point along the first direction when the micro-mirror rotates;

wherein the frame structure has a second degree of spring stiffness along a second direction perpendicular to the first direction; and wherein the second degree of spring stiffness is higher than the first degree of spring stiffness to cause the first connection point and the second connection point to move together along the second direction when the micro-mirror rotates.

6. The apparatus of claim 1, wherein the frame structure comprises at least one of: a rectangular shape, an oval shape, and a diamond shape.

7. The apparatus of claim 1, wherein the actuator, the deformable force-transfer connection structure, and the micro-mirror are formed from patterning a single layer of silicon material; and wherein the micro-mirror assembly is formed by stacking the patterned single layer of silicon material on the substrate having a cavity such that the actuator, the deformable force-transfer connection structure, and the micro-mirror suspend over the cavity.

8. The apparatus of claim 1, wherein the actuator is mechanically connected to a bottom surface of the micro-mirror opposite to a light-reflecting surface of the micro-mirror.

9. The apparatus of claim 8, wherein the micro-mirror is formed from patterning a first layer of silicon material;

wherein the actuator is formed from patterning a second layer of silicon material; and wherein the micro-mirror assembly is formed by stacking the patterned first layer of silicon material and the patterned second layer of silicon material on the substrate having a cavity such that the actuator and the micro-mirror suspend over the cavity.

10. The apparatus of claim 1, wherein the actuator is a first actuator;

wherein the end is a first end;

wherein the apparatus further comprises a second actuator mechanically connected to a second end of the micro-mirror, the second end being opposite to the first end; and wherein the first actuator and the second actuator are configured to bend at opposite directions and to move, respectively, the first end and the second end by the same displacement.

11. The apparatus of claim 10, wherein the micro-mirror is not mechanically connected to the substrate at the rotational axis.

12. The apparatus of claim 1, further comprising
a receiver;
a light source;
a controller configured to control the actuator to rotate the micro-mirror to set one of: an input path of light to the receiver, and an output projection path of light from the light source.

13. The apparatus of claim 12,
wherein the light source is a pulsed light source; and
wherein the controller is configured to:
control the light source to generate a first light pulse at a first time;
control the actuator to set a first angle of the output projection path to project the first light pulse towards an object along the output projection path;
control an actuator of each micro-mirror assembly to set a second angle of the input path to steer a second light pulse reflected from the object to the receiver, the second light pulse being received at the receiver at a second time; and
determine a location of the object with respect to the apparatus based on a difference between the first time and the second time, as well as on the first angle and the second angle.

14. An apparatus, the apparatus being part of a Light Detection and Ranging (LiDAR) module of a vehicle and comprising:
a semiconductor integrated circuit comprising a micro-electromechanical system (MEMS) and a substrate, the MEMS comprising an array of micro-mirror assemblies, each micro-mirror assembly comprising:

a micro-mirror;
a first actuator directly connected to the substrate and mechanically connected to a first end of the micro-mirror spaced from a rotation axis of the micro-mirror and situated beyond a planar extension in an x dimension and y dimension of the micro-mirror, the first actuator configured to deform in response to an electrical signal and generate a corresponding torque that rotates the micro-mirror around the rotation axis to reflect light emitted by a light source out of the LiDAR module or to reflect light received by the LiDAR module to a receiver,
wherein the first actuator comprises a piezoelectric actuator deformable to bend up or down along a first axis perpendicular to the rotation axis of the micro-mirror to exert the torque;
a deformable force-transfer connection structure directly connected to the actuator and mechanically connected to the micro-mirror;
wherein the first actuator is configured to exert the torque to the micro-mirror via the deformable force-transfer connection structure;
wherein the deformable force-transfer connection structure deforms when the micro-mirror rotates;
wherein the deformable force-transfer connection structure comprises a first bar, a second bar, and a frame structure between the first bar and the second bar, the first bar being directly connected to the first actuator, the second bar being mechanically connected coupled to the micro-mirror, and the frame structure being directly connected to each of the first bar and the second bar at, respectively, a first connection point and a second connection point;
wherein the apparatus further comprises a second actuator mechanically connected to a second end of the micro-mirror, the second end being opposite to the first end;
wherein the first actuator and the second actuator are configured to bend at opposite directions and to move, respectively, the first end and the second end by the same displacement; and
a pair of second connection structures mechanically connected to the micro-mirror and placed over a pair of grooves formed on the substrate, the pair of second connection structures being rotatable over the pair of grooves.

15. A method comprising:
determining a target rotation angle of a micro-mirror of each micro-mirror assembly of an array of micro-mirror assemblies of a microelectromechanical system (MEMS) implemented on a semiconductor substrate, each micro-assembly further comprising a deformable actuator directly connected to the substrate and mechanically connected to an end portion of the micro-mirror spaced from a rotation axis of the micro-mirror and situated beyond a planar extension in an x dimension and y dimension of the micro-mirror, the MEMS being part of a Light Detection and Ranging (LiDAR) module;
generating, based on the target rotation angle, an electrical signal;
deforming, using the electrical signal, an actuator of each micro-mirror assembly to generate a torque; and
deforming a force-transfer connection structure between the actuator and the micro-mirror, the force-transfer connection structure including a first bar, a second bar, and a frame structure between the first bar and the second bar, the first bar being directly connected to the actuator, the second bar being mechanically coupled to the micro-mirror, and the frame structure having one of a larger dimension than the first and second bars and forming an enclosed structure, and being directly connected to each of the first bar and the second bar at, respectively, a first connection point and a second connection point;
rotating, using the torque, the micro-mirror of each micro-mirror assembly around a rotation axis by the target rotation angle to reflect light emitted by a light source out of the LiDAR module or to reflect light received by the LiDAR module to a receiver; and
determining a frequency of rotation of the micro-mirror mostly based on a degree of spring stiffness of the actuator.

* * * * *